(12) United States Patent
Abedi

(10) Patent No.: US 7,719,973 B2
(45) Date of Patent: May 18, 2010

(54) METHOD AND APPARATUS FOR PACKET SCHEDULING

(75) Inventor: Saied Abedi, Berkshire (GB)

(73) Assignee: Fujitsu Limited, Kawasaki (JP)

( * ) Notice: Subject to any disclaimer, the term of this patent is extended or adjusted under 35 U.S.C. 154(b) by 984 days.

(21) Appl. No.: 11/183,239

(22) Filed: Jul. 15, 2005

(65) Prior Publication Data

US 2006/0023659 A1 Feb. 2, 2006

Related U.S. Application Data

(63) Continuation of application No. PCT/GB2004/000642, filed on Feb. 18, 2004.

(30) Foreign Application Priority Data

| | | | |
|---|---|---|---|
| Feb. 19, 2003 | (GB) | ................................. | 0303859.3 |
| Apr. 16, 2003 | (GB) | ................................. | 0308931.5 |

(51) Int. Cl.
*H04L 29/02* (2006.01)
(52) U.S. Cl. ..................................... 370/230
(58) Field of Classification Search ................ 370/230, 370/252, 329
See application file for complete search history.

(56) References Cited

U.S. PATENT DOCUMENTS

| | | | | |
|---|---|---|---|---|
| 6,229,795 | B1 | 5/2001 | Pankaj et al. | |
| 6,493,331 | B1 | 12/2002 | Walton et al. | |
| 6,721,278 | B1 * | 4/2004 | Rimhagen et al. | ........... 370/252 |
| 7,293,013 | B1 * | 11/2007 | Horvitz et al. | ................. 707/2 |
| 2002/0176380 | A1 | 11/2002 | Holtzman et al. | |
| 2003/0096597 | A1 | 5/2003 | Au et al. | |

(Continued)

FOREIGN PATENT DOCUMENTS

EP 1 130 872 9/2001

(Continued)

OTHER PUBLICATIONS

International Search Report dated Oct. 11, 2004 issued for PCT/GB2004/000649.

(Continued)

*Primary Examiner*—Derrick W Ferris
*Assistant Examiner*—Christopher R Crompton
(74) *Attorney, Agent, or Firm*—Katten Muchin Rosenman LLP

(57) ABSTRACT

Packet scheduling apparatus schedules packets of data for transmission from a transmitter such as a Note B to a plurality of receivers such as a plurality of UEs via at least one channel, for example in a high-speed downlink packet access system (HSDPA). A first measures producing unit produces first measures of scheduling performance in at least two different aspects. A decision unit employs a weighted combination of the first measures to decide the receiver(s) to which packets are to be transmitted. The weighted combination is produced by combining the first measures according to respective corresponding weights. A second measures producing unit produces at least one second measure of scheduling performance. A classifying unit classifies the weights for the or each second measure into at least two different classes of weights according to a probable influence the weight is expected to have on the second measure concerned. A weight adapting unit employs the or each second measure, together with the classification of the weights for the or each second measure, to adapt the weights.

34 Claims, 25 Drawing Sheets

U.S. PATENT DOCUMENTS

2004/0122950 A1* 6/2004 Morgan et al. ............... 709/226
2005/0249497 A1* 11/2005 Haran et al. ................... 398/58

FOREIGN PATENT DOCUMENTS

| EP | 1 162 790 | 12/2001 |
|---|---|---|
| EP | 1 227 626 | 7/2002 |
| JP | 2001/285363 | 10/2001 |
| WO | WO 00/41542 | 7/2000 |
| WO | WO 02/088879 | 11/2002 |
| WO | WO 02/101954 | 12/2002 |

OTHER PUBLICATIONS

United Kingdom Search Report dated Aug. 21, 2003 issued for United Kingdom Patent Application 0308931.5.

United Kingdom Search Report dated Jul. 30, 2003 issued for United Kingdom Patent Application 0303859.3.

International Search Report dated Oct. 6, 2004 issued for PCT/GB2004/000642.

Saied Abedi et al., "A Radio Aware Random Iterative Scheduling Technique for High Speed Downlink Packet Access", IEEE 56$^{th}$ Vehicular Technology Conference Proceedings, vol. 1 of 4, Sep. 24, 2002, pp. 2322-2326.

Saied Abedi et al., "Hybrid Genetic Packet Scheduling and Radio Resource Management for High Speed Downlink Packet Access", IEEE, vol. 3, Oct. 27, 2002, pp. 1192-1196.

International Preliminary Report on Patentability dated Sep. 1, 2005 for corresponding International Application No.: PCT/GB2004/000642.

* cited by examiner

| FIRST STEP | | | | | |
|---|---|---|---|---|---|
| RANK | UE NO. | CHANNEL ALLOCATION MEASURE | NORMALISED | NO. CH. | ROUNDED |
| 1 | 30 | 1.5 | 0.12 | 1.23 | 1 |
| 2 | 2 | 4.3 | | | |
| 3 | 9 | 1.2 | | | |
| 4 | 11 | 2 | | | |
| 5 | 17 | 3.2 | | | |
| SUM | | 12.2 | | | |
| LEFT | | | | | 9 |
| SECOND STEP | | | | | |
| RANK | UE NO. | CHANNEL ALLOCATION MEASURE | NORMALISED | NO. CH. | ROUNDED |
| 1 | 30 | | | | |
| 2 | 2 | 4.3 | 0.40 | 3.62 | 3 |
| 3 | 9 | 1.2 | | | |
| 4 | 11 | 2 | | | |
| 5 | 17 | 3.2 | | | |
| SUM | | 10.7 | | | |
| LEFT | | | | | 6 |
| THIRD STEP | | | | | |
| RANK | UE NO. | CHANNEL ALLOCATION MEASURE | NORMALISED | NO. CH. | ROUNDED |
| 1 | 30 | | | | |
| 2 | 2 | | | | |
| 3 | 9 | 1.2 | 0.19 | 1.13 | 1 |
| 4 | 11 | 2 | | | |
| 5 | 17 | 3.2 | | | |
| SUM | | 6.4 | | | |
| LEFT | | | | | 5 |
| FOURTH STEP | | | | | |
| RANK | UE NO. | CHANNEL ALLOCATION MEASURE | NORMALISED | NO. CH. | ROUNDED |
| 1 | 30 | | | | |
| 2 | 2 | | | | |
| 3 | 9 | | | | |
| 4 | 11 | 2 | 0.38 | 1.92 | 1 |
| 5 | 17 | 3.2 | | | |
| SUM | | 5.2 | | | |
| LEFT | | | | | 4 |
| FIFTH STEP | | | | | |
| RANK | UE NO. | CHANNEL ALLOCATION MEASURE | NORMALISED | NO. CH. | ROUNDED |
| 1 | 30 | | | | |
| 2 | 2 | | | | |
| 3 | 9 | | | | |
| 4 | 11 | | | | |
| 5 | 17 | 3.2 | 1.00 | 4.00 | 4 |
| SUM | | 3.2 | | | |
| LEFT | | | | | 0 |

*Fig.6*

METHOD AND APPARATUS FOR PACKET SCHEDULING

CROSS-REFERENCE TO RELATED APPLICATION

This application is a continuation of International Application PCT/GB2004/000642 filed on Feb. 18, 2004, now International Publication WO 2004/075568 and claims priority from United Kingdom Patent Applications 0303859.3 filed on Feb. 19, 2003 and 0308931.5 filed on Apr. 16, 2003, the contents of which are herein wholly incorporated by reference.

BACKGROUND OF THE INVENTION

1. Field of the Invention

The present invention relates to packet scheduling methods and apparatus for use, for example, in wireless communication systems.

2. Description of the Related Art

FIG. 1 shows parts of a wireless communication system 1. The system includes a plurality of base stations 2, only one of which is shown in FIG. 1. The base station 2 serves a cell in which a plurality of individual users may be located. Each user has an individual user equipment (UE). Only the user equipments UE2, UE11 and UE50 are shown in FIG. 1. Each UE is, for example, a portable terminal (handset) or portable computer.

As is well known, in a code-division multiple access (CDMA) system the signals transmitted to different UEs from the base station (also known as "node B") are distinguished by using different channelisation codes. In so-called third generation wireless communication systems a high speed downlink packet access (HSDPA) technique has been proposed for transmitting data in the downlink direction (from the base station to the UEs). In this technique a plurality of channels are available for transmitting the data. These channels have different channelisation codes. For example, there may be ten different channels C1 to C10 available for HSDPA in a given cell or sector of a cell. In HSDPA, downlink transmissions are divided up into a series of transmission time intervals (TTI), and a packet of data is transmitted on each different available channel to a selected UE. A new choice of which UE is served by which channel can be made in each TTI.

FIG. 2 shows an example of the operation of the HSDPA technique over a series of transmission time intervals TTI1 to TTI9. As shown in FIG. 2, in TTI1 it is determined that two packets will be sent to UE50, four packets will be sent to UE11 and four packets will be sent to UE2. Accordingly, two channels are allocated to UE50 and four channels each are allocated to UE11 and UE2. Thus, as shown in FIG. 1, UE50 is allocated channels C1 and C2, UE11 is allocated channels C3 to C6, and UE2 is allocated channels C7 to C10.

In the next transmission time interval TTI2 a new user equipment UE1 is sent one packet, and the remaining UEs specified in TTI1 continue to receive packets.

Thus, effectively the HSDPA system employs a number of parallel shared channels to transmit data in packet form from the base station to the different UEs. This system is expected to be used, for example, to support world wide web (WWW) browsing.

In order to decide which UE should be served on which channel in each TTI a packet scheduling technique is employed. Conventionally, two basic types of scheduling technique have been considered for use in HSDPA: a round-robin (RR) scheduling technique and a maximum carrier-to-interference ratio (max C/I) technique.

The basic round-robin technique first compiles a list of the UEs which currently have data waiting at the transmitter (base station) for transmission. For each TTI the last UE in the list will have the highest priority for the next TTI. Accordingly, the UEs are serviced in a round robin fashion. In the simplest round-robin scheduling technique, it is assumed that the UE with the highest priority takes all of the channels. However, a packet-weighted round-robin technique is also known. This allocates the available channels to a group of users in each TTI based on the relative amounts of data for the different UEs. In this packet-weighted technique UEs which have more data waiting for transmission are allocated more channels.

The round-robin scheduling techniques emphasise fairness amongst the competing UEs in terms of radio resource allocation. However, they tend to provide relatively poor total throughput of data.

The max C/I scheduling technique is similar to the round-robin scheduling technique except that the list of UEs having waiting data is sorted in each TTI based on a carrier-to-interference ratio (C/I) reported by each UE. The C/I is a measure of the quality of the channel. By sorting the list of UEs based on C/I, UEs which have a better channel quality are given a higher chance to be selected. In the simplest version of the technique, all of the channels are allocated to the UE with waiting data that has the highest C/I. A packet-weighted variant is also possible, in which instead of selecting a single UE having the highest C/I, a group of UEs with the highest C/I values is selected, and the available channels are divided up amongst the group of UEs based on the relative amounts of data which those UEs have waiting for transmission.

The max C/I scheduling technique tends to maximise the total throughput of data but this is at the expense of fairness. It can be seen that UEs which report poor C/I values, for example because they are far from the base station or because there are many other interfering UEs in the vicinity, will only very rarely be selected. Thus, these UEs are likely to suffer from unacceptably long delays in receiving packets.

Another scheduling technique is disclosed in "A proposal of all-IP mobile wireless network architecture—QoS packet scheduler for base stations", Masahiro Ono et al, NEC Corporation, Technical Report of IEICE, MoMuC2002-3 (2002-05), pp. 13-18. This packet scheduling technique aims to meet quality of service (QoS) requirements of different UEs and to maximise the system capacity by adaptively allocating timeslots according to the wireless link quality and the required QoS levels. The technique employs a hierarchy of different individual schedulers including a max C/I scheduler, a proportional fairness (PF) scheduler, a weighted round robin (WRR) scheduler and a priority round robin (PRR) scheduler. Packets to be scheduled are pre-classified by a classifier according to the different QoS requirements of the different UEs. Packets belonging to different classes are then applied to different schedulers in the first level of schedulers in the hierarchy. Further scheduling is carried out in second and third levels of the hierarchy. In this way, multiple individual schedulers are used to cater for the different requirements of different classes of services. However, partitioning the scheduling process in a fixed way or slow-changing dynamic way proves difficult and inefficient because of the fast-changing dynamics of the radio channels. The result may be that the scheduler assigned to one partition (class of service) will be under a high pressure to provide the required QoS level, but the scheduler assigned to another partition (class of service) is underutilised and has spare capacity. It is also found that the efficiency and performance of such partitioned schedulers degrade considerably as the amount of the shared bandwidth and the range of services having differing requirements increase. Attempts to recover some of the lost efficiency in such partitioned schedulers in practice result only in increased computational complexity and attendant costs.

In United Kingdom patent application no. 0303859.3, from which the present application claims priority and which has been published in the official file of the present PCT application (publication no. WO 2004/075568), the present inventor has proposed a packet scheduling method for scheduling packets of data for transmission from a transmitter via at least one channel to a plurality of receivers, for example in an HSDPA system of a wireless communications network. Weightings are assigned to at least two different aspects of scheduling performance, for example quality of service, delay and fairness. For each individual receiver at least one combined measure of the scheduling performance in the different aspects is produced according to the assigned weightings. The respective combined measures for different receivers are employed to decide the receiver(s) to which packets are to be transmitted. PCT application no. PCT/GB2004/000649, filed on the same date as the present application and published as WO 2004/075569, corresponds to GB 0303859.3. The entire contents of GB 0303859.3 and the PCT application are incorporated herein by reference, and copies of these applications have been filed with the present application.

This packet scheduling method enables scheduling of data to be carried out for all the receivers as a single group, without having to classify the receivers into different scheduling classes such as different service types. The method also enables the scheduling to take account of several different performance aspects without significant computational complexity.

In this method, the weights are assigned values taking account of the expected traffic scenario. For example, various simulations were carried out, each relating to a simulated traffic environment in which there are 40 UEs in total. 10 of these UEs were assumed to be attempting to receive real-time video and the remaining 30 UEs were assumed to be attempting WWW browsing sessions. In one simulation, the total aggregate traffic load was assumed to be approximately constant over a series of 5,000 TTIs (ten second period). In another simulation, the WWW users were assumed to become active in a staggered manner, giving rise to a variable input load on the scheduler. In a third simulation, it was assumed that a slowing mechanism was provided by the HSDPA system for WWW browsing. Such a slowing mechanism prevents the downloading of a new session unless a previous session has been successfully downloaded completely.

It was found from these simulations that the weightings which must be applied to the different aspects of scheduling performance need to be significantly different for the different traffic scenarios. In view of this, it was envisaged that the weightings could be adjustable by an operator of the scheduler so that when the expected traffic scenario changes the weights can be changed as well. It was also envisaged in United Kingdom patent application no. 0303859.3 that the weights could be adjusted automatically during operation of the apparatus.

In S. Abedi, S. Vadgama, "Hybrid Genetic Packet Scheduling and radio Resource Management for High Speed Downlink Packet Access", WPMC 2002 Conference, Hawaii, pp. 1192-1196 the present inventor has also proposed a packet scheduling technique employing a genetic algorithm. In this technique, a plurality of candidate scheduling solutions are generated for each TTI. Each candidate solution corresponds to an individual in the genetic algorithm and specifies which receivers are to be allocated which channels in the TTI concerned. The fitness of each candidate scheduling solution is determined. The fitness may take into account several different measures of performance of the scheduling solution concerned, for example throughput, delay and fairness. The individual performance measures may be weighted when determining the fitness for each candidate solution. Individuals in the current generation are selected as parents based on the fitness values of the corresponding candidate solutions. Fitter solutions have a higher chance of being selected as parents. Children (candidate solutions for the next generation) are produced by the selected parents in accordance with genetic operators such as crossover and mutation. In this way, over a series of iterations (generations) the genetic algorithm refines the candidate scheduling solutions until, at some point, a single best solution is selected for the TTI under consideration.

Such a genetic algorithm offers the potential for achieving much better scheduling performance than conventional techniques such as round robin scheduling and max C/I scheduling.

Another packet scheduling method has been proposed by the present inventor in S. Abedi, S. Vadgama, "A Radio Aware Random Iterative Scheduling Technique for High Speed Downlink Packet Access", VTC 2002, Fall, vol. 4, pp. 2322-2326, 24-28, September 2002. This method also generates a plurality of candidate scheduling solutions for each TTI. At least one of the candidate solutions is generated randomly. The fitness of each candidate solution may be determined in the same way as for the proposed scheduling method based on a genetic algorithm, as described above.

The success of such packet scheduling methods is also heavily dependent on the choice of appropriate weights for weighting the individual performance measures when determining the fitness for each candidate solution. In particular, different weights are required to deal with different traffic scenarios.

The same problem of assigning proper weights under different conditions also arises in other types of packet schedulers conceived for use in wireless networks. For example, a so-called proportionally fair (PF) scheduler is described in R. Agrawal, et. al. "Class and Channel Condition Based Scheduler for EDGE/GPRS", Proc. of SPIE, vol.#4531, August 2001, and A. Jalali, R. Padovani, R. Pankaj; "Data throughput of CDMA-HDR a high efficiency-high data rate personal communication wireless system", VTC 2000, Spring, vol. 3, pp. 1854-1858, May 2000. The PF scheduler also requires the assignment of proper weights under different traffic load and channel conditions.

The dynamic mobile cellular environment makes the setting of appropriate weights a challenging task. Firstly, there may be enormous variation between channel conditions.

FIG. 3(A) is a graph illustrating schematically how the reported C/I values for four different UEs vary over a series of N TTIs under first channel conditions. In this case, the C/I values are relatively stable but there is a consistent difference in C/I values from one UE to the next. Some UEs have relatively poor channel conditions over the entire series of N TTIs, and others have relatively good channel conditions over the entire series. Under these channel conditions, many of the scheduling methods outlined above will tend to have difficulty in achieving fairness as between the different UEs.

Other aspects of the scheduling performance, such as overall throughput, are not likely to be a problem.

FIG. 3(B) illustrates the variation of C/I values for four different UEs under second channel conditions different from the first channel conditions the subject of FIG. 3(A). In this case, the variation in C/I values of each individual UE is much greater than in FIG. 3(A) and at different times over the series of N TTIs the different UEs each have good channel conditions. In this situation, it is not a challenge to achieve fairness. Instead, it may be difficult to achieve a high overall throughput or some other desired aspect of scheduling performance.

As well as dealing with variable channel conditions of the kind described with reference to FIGS. 3(A) and 3(B), an effective packet scheduling method must also cope with input traffic load dynamics (variable input pipes) and UEs whose profiles change rapidly as they move and change to using difference services. In particular, a UE may move rapidly from one cell to another. In this case, the packet data which has already been buffered in the existing Node B must be transferred to the new Node B. If there are many such transfers, there may be frequent step-function-like changes in the total load to be handled by a packet scheduler at a given Node B. In some cases, as described later in the present specification, this load variation has been found empirically to lead to a so-called "run-away" phenomenon and instability of the packet scheduler when the weights are fixed. The empirical studies described later have also shown that radical input pipe variations may lead to a significant drop in performance for one or more of the desired aspects of scheduling performance.

The drop in performance may affect only one class of service, for example, real-time services, whilst not affecting another class of service such as non-conversational services. Some schedulers, such as the PF scheduler, purport to address this problem by partitioning the scheduling according to the type of service, and assigning different fixed weights to the different partitions. However, in practice this may prove inefficient since the numbers of UEs using each type of service may change, with the result that the fixed weights are unable to provide a good QoS for the service concerned. For example, if the weights assigned to the different services are fixed and the number of high-bit-rate non-real-time users downloading WWW sessions increases significantly, the Node B would be under huge pressure to provide an acceptable QoS for the real-time video conversational sessions.

It is therefore desirable to provide a packet scheduling method which enables the weights applied to different measures of scheduling performance to be adjusted automatically so as to enable the scheduler to work efficiently under a variety of different traffic scenarios.

SUMMARY OF THE INVENTION

According to a first aspect of the present invention there is provided a packet scheduling method for scheduling packets of data from transmission from a transmitter via at least one channel to a plurality of receivers. The method comprises producing first measures of scheduling performance in at least two different aspects and employing a weighted combination of the first measures to decide the receiver(s) to which packets are to be transmitted. The weighted combination is produced by combining the first measures according to respective corresponding weights assigned to the different aspects. At least one second measure of scheduling performance is produced. For the or each second measure, the weights are classified into at least two different classes of weights according to a probable influence the weight is expected to have on the second measure concerned. The or each second measure is employed, together with the classification of the weights for the or each second measure, to adapt said weights.

In such a method, such a weighted combination of the first measures may be produced per individual receiver (as in the method of GB 0303859.3), so that for example the respective weighted combinations for the different receivers can then be compared with one another to decide the receiver(s) to which packets are to be transmitted. Alternatively, such a weighted combination of the first measures may be produced per candidate scheduling solution, as in the methods described in S. Abedi, S. Vadgama, "Hybrid Genetic Packet Scheduling and radio Resource Management for High Speed Downlink Packet Access", WPMC 2002 Conference, Hawaii, pp. 1192-1196 and S. Abedi, S. Vadgama, "A Radio Aware Random Iterative Scheduling Technique for High Speed Downlink Packet Access", VTC 2002, Fall, vol. 4, pp. 2322-2326, 24-28, September 2002. In these cases, the respective weighted combinations produced for the different candidate scheduling solutions may be compared to select a best candidate scheduling solution or (in the case of a genetic algorithm) to select candidate scheduling solutions to evolve to a next generation.

Preferably, at least one first measure is independent of at least one aspect which influences another one of the first measures. This enables the measures to be independent of one another, enabling accurate control of the scheduling performance to be achieved by controlling the weightings.

At least one first measure may be influenced by a priority assigned to a type of service (e.g. WWW browsing, video) provided to a receiver.

Preferably, at least one first measure is adjusted to reduce a mismatch between it and another one of said first measures. The measures may be adjusted such that all of them are in the same range, e.g. 0 to 1, so that equal weightings have equal effect on the different measures.

One or more of the first measures may be normalised, for example the value for any one receiver may be normalised relative to the sum of the values for all the receivers.

In a preferred embodiment, the or each weighted combination is produced by forming a product of said first measures for the receiver concerned.

There may be a plurality of channels available for transmitting data to the receivers, as in an HSDPA system. In this case, one method embodying the invention further comprises producing respective first and second such weighted combinations for each individual receiver. The receivers are ranked based on their respective first weighted combinations and a list of the receivers is formed in the order in which they are ranked. Channels are allocated to the receivers in the list, based on their respective second weighted combinations, starting from the highest-ranked receiver in the list.

In this embodiment the decision on the receivers to which packets are to be transmitted is influenced by both the first and second weighted combinations, which gives greater flexibility over the scheduling decision.

There are many different aspects of scheduling performance which it may be desirable to consider. These may include success or failure in delivering data to the receiver within a tolerable delay threshold. These may also include a quality of a channel between the transmitter and the receiver, how much data is estimated to be deliverable successfully to the receiver, how much data is waiting at the transmitter for transmission to the receiver, delay in delivering data to the receiver, and fairness as between different receivers. The aspects do not have to be operational ones. For example, a purely commercial aspect could be considered such as profitability for the operator in providing a service to the receiver.

The method is preferably carried out iteratively for a series of scheduling instants, for example TTIs. In one embodiment, for each scheduling instant, new weighted combinations are produced for the receivers and a new decision is made on the receiver(s) to which packets are to be transmitted.

The transmission may be a wireless transmission, the transmitter may be part of a base station of a wireless communication system, and each receiver may be part of a user equipment of that system.

According to a second aspect of the present invention there is provided packet scheduling apparatus for scheduling packets of data for transmission from a transmitter to a plurality of receivers via at least one channel. The apparatus comprises a first measures producing unit which produces first measures of scheduling performance in at least two different aspects and a decision unit which employs a weighted combination of the first measures to decide the receiver(s) to which packets are to be transmitted. The weighted combination is produced by combining the first measures according to respective corresponding weights. A second measures producing unit produces at least one second measure of scheduling performance. A weight classifying unit classifies the weights for the or each second measure into at least two different classes of weights according to a probable influence the weight is expected to have on the second measure concerned. A weight adapting unit employs the or each second measure, together with the classification of the weights for the or each second measure, to adapt the weights.

According to a third aspect of the present invention there is provided a transmitter comprising packet scheduling apparatus embodying the aforesaid second aspect of the invention. The transmitter further comprises a transmission unit connected operatively to the packet scheduling apparatus and operable to cause packets to be transmitted to the receiver(s) decided by the packet scheduling apparatus.

Other objects, features and advantages of the present invention will become apparent from the following detailed description when read in conjunction with the accompanying drawings.

BRIEF DESCRIPTION OF THE DRAWINGS

FIG. 6 is a diagram showing example of a channel allocation process carried out in the FIG. 5 embodiment;

DETAILED DESCRIPTION OF THE PREFERRED EMBODIMENTS

Figure 1:
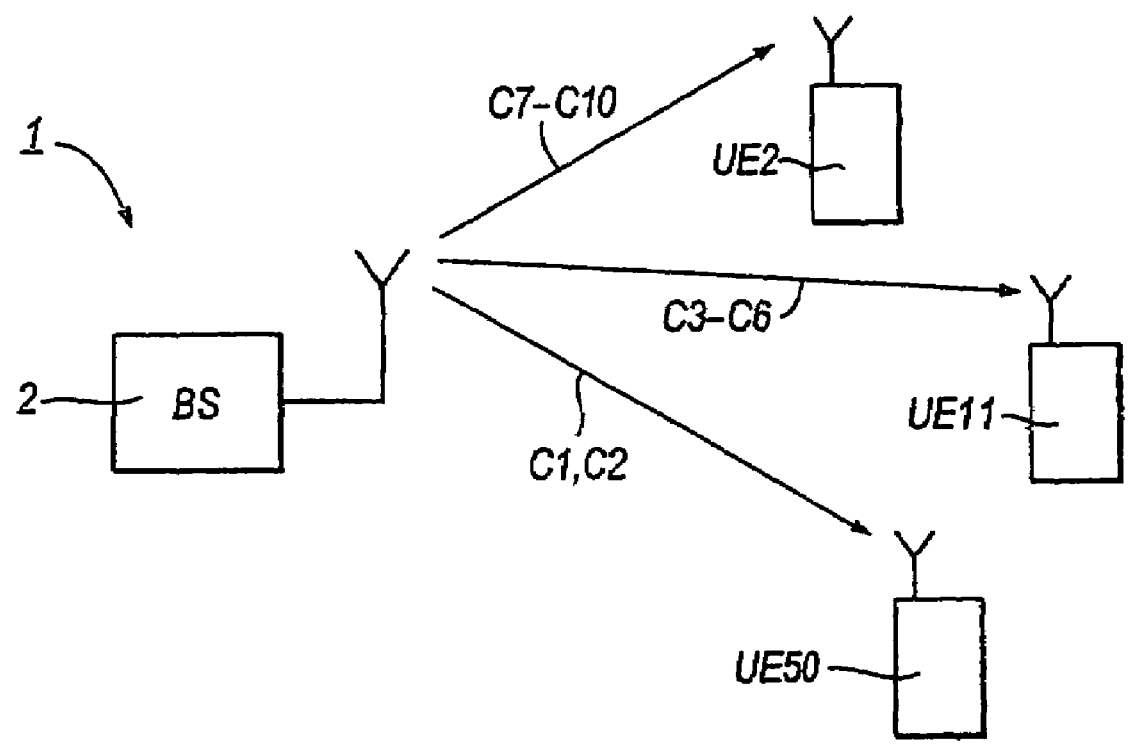
FIG. 1, discussed hereinbefore, shows parts of a wireless communication system employing a HSDPA technique for downlink transmissions.
Figure 2:
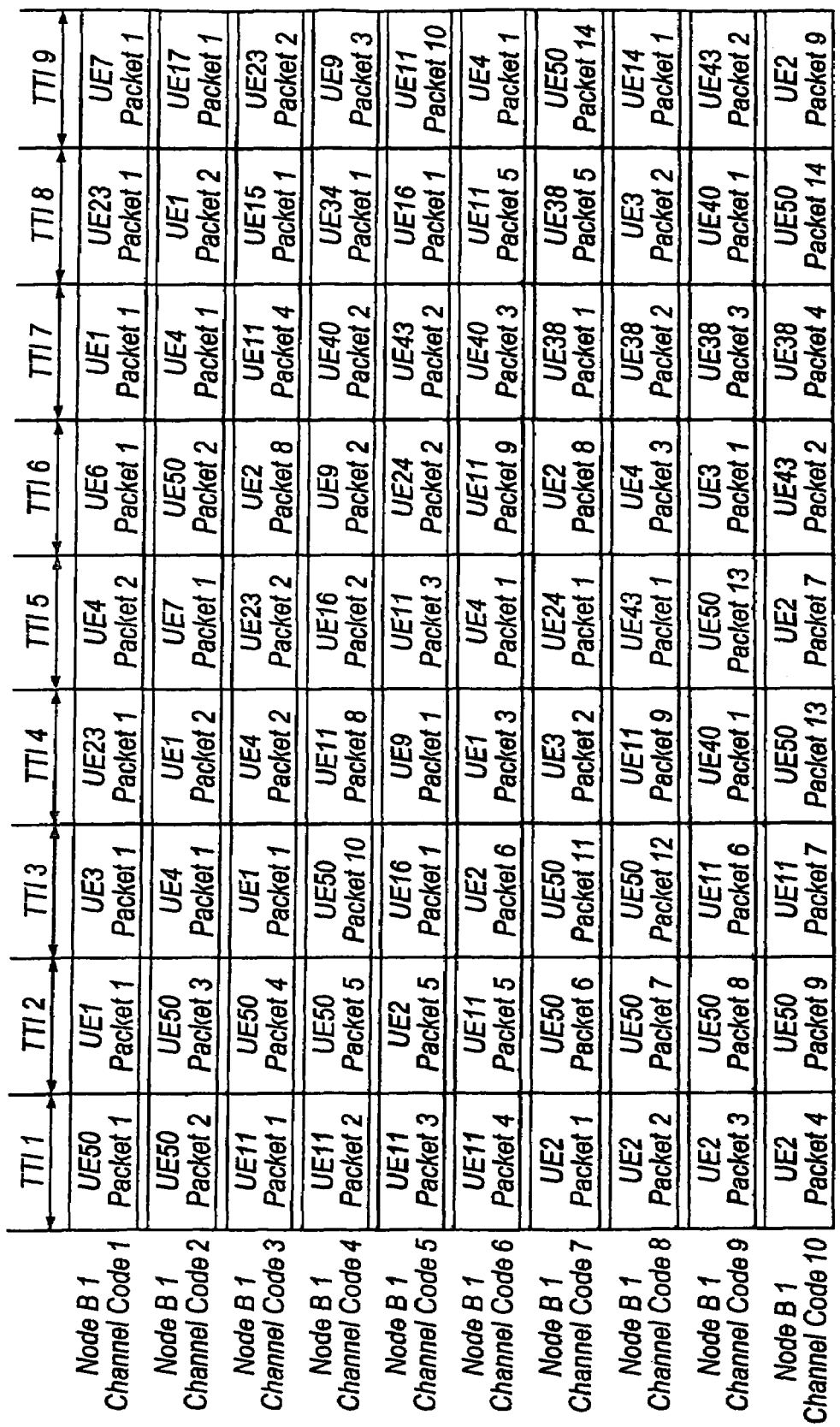
FIG. 2 shows an example of the operation of the HSDPA technique in the FIG. 1 system.
Figure 3:
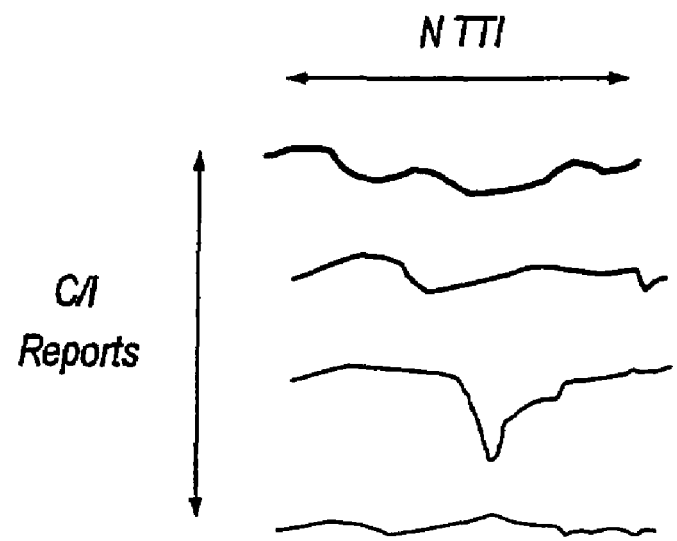
FIGS. 3(A) and 3(B) are graphs for illustrating a variation of C/I values of four UEs under first and second different channel conditions.
Figure 3:
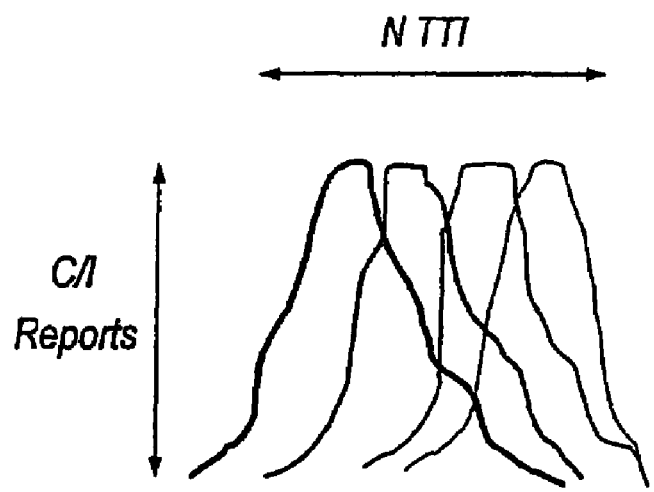
Figure 4:
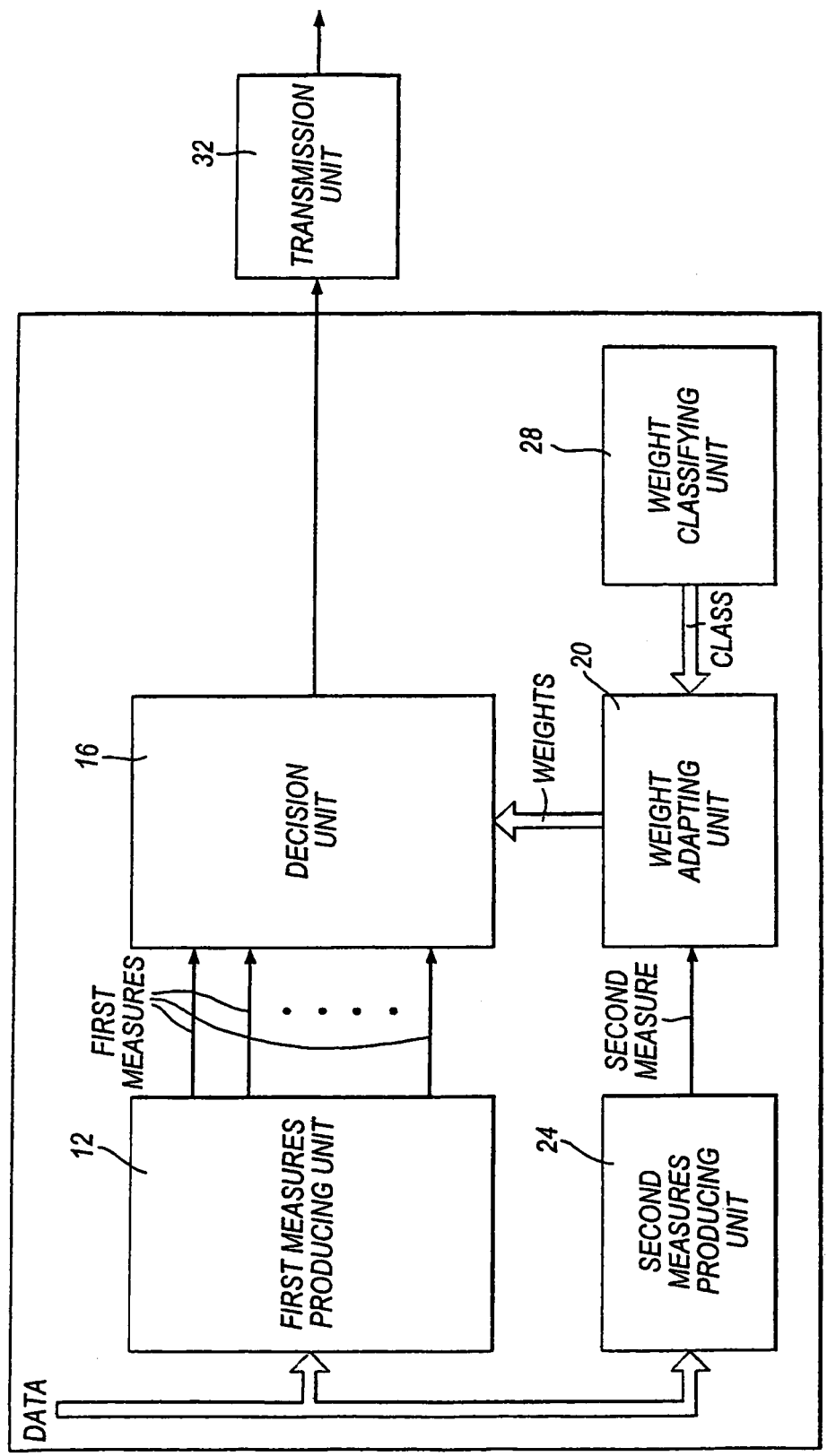
FIG. 4 shows a block diagram of packet scheduling apparatus embodying the present invention.

FIG. 4 shows a block diagram of packet scheduling apparatus 10 embodying the present invention. The apparatus 10 is used to schedule packets of data for transmission from a transmitter to a plurality of receivers via at least one channel. A scheduling decision is made for each successive scheduling instant (eg each TTI). The transmitter is, for example, a base station (Node B) in a wireless communication system. The plurality of receivers in this case are different UEs served by the base station.

The apparatus 10 comprises a first measures producing unit 12 which receives data relating to performance of the scheduling apparatus. The data may include, for example, carrier-to-interference ratio (C/I) reports and information regarding the fill levels of source queues in which the data destined for different receivers is buffered in the transmitter prior to transmission.

Based on the received data, the first measures producing unit 12 produces a set of first measures of scheduling performance. The first measures relate to at least two different aspects of the scheduling performance. For example, as described later in more detail, one of the first measures may relate to throughput, while another of the first measures may relate to delay. Depending on the type of scheduling algorithm used in the apparatus (for which see below), a set of the first measures may be produced per receiver (UE) or per candidate scheduling solution.

The apparatus 10 further comprises a decision unit 16 which receives the set of first measures produced by the first measures producing unit 12. The decision unit 16 also receives a set of weights from a weight adapting unit 20. There is an individually-corresponding weight for each one of the first measures. The decision unit 16 produces a weighted combination of the first measures by combining the first measures according to the respective corresponding weights.

The decision unit 16 employs the weighted combination of the first measures to decide the receiver(s) to which packets are to be transmitted in the scheduling instant under consideration. For example, when a set of first measures is produced per receiver (as in the case of GB 0303859.3), the decision unit 16 may produce a weighted combination of the first measures per receiver, and compare the respective weighted combinations for different receivers to decide the receivers to which packets are to be transmitted. Alternatively, when a set of first measures is produced per candidate scheduling solution (as in the case of the methods in the two papers by S. Abedi et. al. referenced in the introduction) the decision unit 16 may produce a weighted combination per candidate scheduling solution. This weighted combination may, for example, be a fitness function used for comparing the different candidate solutions. The weighted combinations of different candidate solutions are then employed by the scheduling algorithm to decide the receiver(s) to which packets are to be transmitted, for example by selecting a single best candidate scheduling solution or by selecting some of the candidate scheduling solutions for genetic evolution. The way in which the weighted combinations of first measures may be employed to decide the receivers to which packets are to be transmitted in the present invention is not limited to the examples described above.

The apparatus 10 further comprises the weight adapting unit 20 mentioned above, a second measures producing unit 24 and a weight classifying unit 28. The second measures producing unit receives some or all of the data relating to performance of the scheduling apparatus that is supplied to the first measures producing unit 12. Although not shown in FIG. 4, the second measures producing unit 24 may also receive one or more of the first measures produced by the first measures producing unit 12. The second measures producing unit 24 produces at least one second measure of scheduling performance. The or each second measure relates to some aspect of overall scheduling performance, ie taking account of all the receivers collectively. For example, as described later in more detail, the second measures may relate to overall QoS, overall throughput, average throughput for different receivers, and fairness.

For the or each second measure, the weight classifying unit 28 classifies the previously-mentioned weights supplied to the decision unit 16 into at least two different classes of weights according to a probable influence the weight concerned is expected to have on the second measure. For example, the weights may be classified into friendly, hostile and neutral classes. The friendly class may be made up of each weight, if any, whose probable influence on the second measure is expected to be positive. The hostile class may be made up of each weight, if any, whose probable influence on the second measure is expected to be negative. The neutral class may be made up of each weight, if any, whose influence on the second measure is uncertain (not expected to be definitely positive or definitely negative).

The weight adapting unit 20 receives the or each second measure from the second measures producing unit 24 and also receives the information relating to the classification of the weights from the weight classifying unit 28. The weight adapting unit 20 employs the or each second measure, together with the classification of the weights for the or each second measure, to adapt the weights. For example, each weight in the friendly class for a second measure may be increased if the second measure is decreasing or unchanged. Each weight in the hostile class for a second measure may be decreased if the second measure is decreasing or not changing. Each weight in the neutral class for a second measure may be maintained unchanged irrespective of the change in the second measure.

The apparatus 10 is connected operatively to a transmission unit 32 which, when a scheduling instant occurs for which the decision unit 16 has made a scheduling decision, causes packets to be transmitted to the chosen receiver(s).

Next, an embodiment of the present invention suitable for use in an HSDPA system will be described in detail. This embodiment seeks to optimise the performance of the HSDPA system in terms of measures such as quality of service (QoS), channel quality, deliverable data packets, data waiting at the transmitter, and delay profile.

In this embodiment, a set of five first measures of scheduling performance is produced for each UE. The first of these five measures of scheduling performance is a QoS measure. In order to produce this measure, a tolerable delay threshold Tolerance_Delay is defined for each kind of service made available in the HSDPA system. For example, for real-time video services this tolerable delay threshold is assumed to be 100 ms. For worldwide web (WWW) browsing sessions, the tolerable delay threshold is assumed to be 1.5 s. In general, an HSDPA system seeks to deliver the highest possible number of data packets from the transmitter (Node-B) to each UE within the defined tolerable delay threshold.

Assume that N is the total number of UEs to which packets are being transmitted during the current TTI. $Oct_{Received\_n}$ is the number of octets which have been delivered successfully (error-free) to the nth UE. These error-free delivered octets can be divided into QoS-satisfied and QoS-failed octets. QoS-failed octets are the octets delivered outside the tolerable delay threshold. Therefore, for each UE, the number of QoS-satisfied received octets may be defined as $$Oct_{Received\_Satisfied\_QoS_n} = Oct_{Received_n} - Oct_{Received\_Failed\_QoS_n}, n=1\ldots N \quad (1)$$

where $Oct_{Received\_Satisfied\_QoS_n}$ is the number of QoS-satisfied octets and $Oct_{Received\_Failed\_QoS_n}$ is the number of received QoS-failed octets for nth UE.

Incidentally, it is possible for the Node-B to find out the delivery delays of the packets it transmits to each UE based on acknowledge messages ACK transmitted back to the Node-B by the UE after received. Further information concerning these acknowledge messages is provided, for example, in our co-pending United Kingdom patent application no. 0216245.1.

For each UE the proportion of throughput which satisfies the QoS requirement may be defined as $$\text{Throughput\_Satisfy\_QoS}_n = \frac{Oct_{\text{Received\_Satisfied\_QoS}_n}}{Oct_{\text{Arrived\_Node\_B}_n}}, n = 1 \ldots N \quad (2)$$

where $Oct_{Arrived\_Node\_B_n}$ is the number of octets originally delivered to a source queue for the nth UE at Node B.

In the case in which no packet has arrived at Node B for the nth UE, it is assumed that Throughput_Satisfy_QoS$_n$=0 for that UE.

This value then becomes subject to a nonlinear transform so that $$\text{Ratio\_Satisfy\_QoS}_n = 1/(1+\text{Throughput\_Satisfy\_QoS}_n), n=1\ldots N \quad (3)$$

The QoS measure for each UE then is defined as $$\text{Metric\_QoS}_n = \frac{\text{Ratio\_Satisfy\_QoS}_n}{\sum_{i=1}^{N} \text{Ratio\_Satisfy\_QoS}_i}, n = 1 \ldots N \quad (4)$$

This normalisation is applied to the final measure in order to map the values of the QoS measures to a range between 0 and 1.

The second of the five first measures in this embodiment is based on the reports of C/I values received from the UEs. In order to map the C/I measure for each UE to a range between 0 and 1 each reported C/I value is scaled relative to the sum of all of the reported C/I values:

$$\text{Metric\_C/I}_n = \frac{C/I_n}{\sum_{i=1}^{N} C/I_i}, n = 1 \ldots N \quad (5)$$

where $C/I_n$ is the reported value of C/I for the nth UE.

The third of the five first measures in this embodiment relates to an estimated number of efficiently deliverable octets Eff_Oct$_n$ for each UE. In this case, it is assumed that the HSDPA system employs an adaptive modulation and coding (AMC) technique to enable the transmitter (Node-B) to select different modulation and/or coding schemes under different channel conditions. In the AMC technique, each UE produces a measure of a downlink channel quality it is experiencing from the base station, and reports this measure to the Node-B. The measure is, for example, a C/I value for the downlink channel. The Node-B then employs the reported channel measures for each UE, as well as information relating to the system limitations and available modulation and coding scheme (MCS) levels, to identify the most efficient MCS level for the particular UE. Thus, UEs that have better channels or are located in the vicinity of the Node-B can employ higher MCS levels and therefore enjoy higher transmission rates. This selection can be carried out, for example, by imposing C/I value thresholds (eg −8 dB, −2 dB, +4 dB) for moving to the next MCS level. Effectively, the result is a classification of the transmission rates based on the channel quality of each UE.

In the present embodiment, it is assumed that each UE reports a C/I value in every TTI and that Node-B is capable of setting a new MCS level for each available channel in every TTI.

Another factor which impacts the number of efficient deliverable octets for each UE is the way in which erroneously-received packets are dealt with. In the present embodiment, it is assumed that a so-called chase combining process is applied to such erroneously-received packets (failed packets). In the chase combining process a failed packet is resent by the Node-B and subsequently the UE "soft" combines (for example using maximal ratio combining) all received copies of the same packet. The effective carrier-to-interference ratio (C/I) is then the sum of the respective C/Is of the two packets being combined. Thus the chase combining process improves the C/I of the transmitted packets.

It is also assumed that all retransmissions have a higher priority than first transmissions. This means that all retransmission packets are given the opportunity to be transmitted before the first transmissions of new packets.

To estimate the number of efficiently deliverable octets for a UE, firstly the most efficient MCS level MCS$_n$ for the UE$_n$ is determined. Secondly, it is determined if the UE$_n$ is in transmission mode (ready to receive a new packet for the first time) or in retransmission mode (waiting for the Node-B to retransmit a packet which was previously erroneously received by the UE).

If the UE is in retransmission mode then the number of octets available for transmission Oct$_n$ is determined based on $$Oct_n = \min(Oct(MCS_n), Oct\_\text{Retransmit}_n), n=1\ldots N \quad (6)$$

where Oct(MCS$_n$) is the maximum number of octets that the MCS level selected for the nth UE can deliver, and Oct_Retransmit$_n$ is the number of octets available for retransmission (ie the number of octets waiting at Node-B to be retransmitted to the UE).

If the UE is in transmission mode the number of octets available for transmission is determined based on $$Oct_n = \min(Oct(MCS_n), Oct\_\text{Waiting\_in\_Queue}_n), n=1\ldots N \quad (7)$$

where Oct_Waiting_in_Queue$_n$ represents the number of octets in a Node-B queue for transmission to the nth UE.

The maximum number of octets available for transmission by any one of the UEs then is determined based on $$Oct_{n_{max}} = \max(Oct_n), n=1\ldots N \quad (8)$$

where $n_{max}$ represents the number of the UE with maximum number of available octets for transmission (the "best UE") and $Oct_{n_{max}}$ is the maximum number of available octets for transmission to that best UE.

The efficient estimated deliverable octets for the best UE is then determined based on $$\text{Eff\_}Oct_{n_{max}} = Oct_{n_{max}} \cdot (1 - FER_{n_{max}}) \quad (9)$$

where $FER_{n_{max}}$ is an estimated frame error rate for the $n_{max}$ th UE.

The efficient number of deliverable octets for the nth UE is then normalised relative to this maximum value so that the third individual measure becomes $$\text{Metric\_}Oct_n = Oct_n \cdot (1 - FER_n)/\text{Eff\_}Oct_{n_{max}}, n=1\ldots N \quad (10)$$

The fourth of the five first measures of performance in this embodiment is a measure of how much data is waiting at the Node-B for transmission to each UE. This is related inversely to throughput of data to each UE.

For the nth UE the throughput is defined as $$Th_n = \frac{(Oct_{Received})_n}{(Oct_{Arrived\_Node\_B})_n}, n = 1 \ldots N \qquad (11)$$

Then a ratio Metric_Waiting_Ratio$_n$ of data waiting to be delivered is defined as $$\text{Metric\_Waiting\_Ratio}_n = 1 - Th_n, n=1 \ldots N \qquad (12)$$

The last of the five first measures of performance in this embodiment relates to the delays being experienced by each UE. Firstly, the oldest undelivered octet waiting in the Node-B for transmission to the UE is considered, and the amount of delay to which that octet is subject is determined.

$$\text{Delay}_n = M.TTI - \text{Arrival\_Time\_Earliest}_n, n=1 \ldots N \qquad (13)$$

where M.TTI represents current time and Arrival_Time_Earliest$_n$ represents the time of arrival at the Node-B source queue for the nth UE of the oldest undelivered octet.

Next, using the same tolerable delay thresholds established for different services as described above in relation to the first measure, the distance by which the worst delay experienced by the UE is from its tolerable delay threshold is calculated.

$$\text{Delay\_Distance}_n = \text{Delay}_n - \text{Tolerance\_Delay}_{\_\_}, n=1 \ldots N \qquad (14)$$

where Delay_Distance$_n$ is the distance from the threshold for the nth UE.

The delay distances of all the UEs then are mapped to positive values. To perform the positive mapping first the minimum distance is determined so that $$\text{Delay\_Distance}_{min} = \min(\text{Delay\_Distance}_n), n=1 \ldots N \qquad (15)$$

The adjusted delay distance then is defined as $$\text{Adjusted\_Delay\_Distance}_n = \text{Delay\_Distance}_n - \text{Delay\_Distance}_{min}, n=1 \ldots N \qquad (16)$$

Then a nonlinear mapping is applied. The result is $$\text{Mapped\_Delay}_n = \beta_n / (1 + \text{Adjusted\_Delay\_Distance}_n), n=1 \ldots N \qquad (17)$$

where Mapped_Delay$_n$ is the mapped delay value for the nth UE and $\beta_n$ is a parameter which specifies the priority of the service being provided to the nth UE. Here, for example, a service is WWW browsing or real-time video. The higher $\beta_n$, the higher is the priority of the service.

The final measure relating to delay is determined as $$\text{Metric\_Delay}_n = \frac{\text{Mapped\_Delay}_n}{\sum_{n=1}^{N} \text{Mapped\_Delay}_n}, n = 1 \ldots N \qquad (18)$$

which guarantees that the measure Metric_Delay$_n$ is mapped to a value between 0 and 1.

In this embodiment a first weighted combination of the first measures for each UE is calculated by forming a weighted product of the individual performance measures as follows $$\text{Ranking\_Metric}_n = (1 + W_1(m) \cdot \text{Metric\_QoS}_n(m)) \cdot \qquad (19)$$
$$(1 + W_2(m) \cdot \text{Metric\_C/I}_n(m)) \cdot (1 + W_3(m) \cdot \text{Metric\_Oct}_n(m)) \cdot$$
$$(1 + W_4(m) \cdot \text{Metric\_Waiting\_Ratio}_n(m)) \cdot$$
$$(1 + W_5(m) \cdot \gamma(m, j) \cdot \text{Metric\_Delay}_n(m))$$

where $W_k(m)$ represents a first set of k weights (ranking weights) at the mth TTI and the index a denotes the nth UE, and Metric_QoS$_n$(m), Metric-C/I$_n$(m), Metric_Oct$_n$(m), Metric_Waiting_Ratio$_n$(m) and Metric_Delay$_n$(m) are the values of the five first measures defined in equations (1) to (18) above at the mth TTI.

$\gamma(m, j)$ is a variable delay tolerance related weight which is assigned to a group j of UEs with the same delay tolerance and which is used for fine tuning of priority of services. As described later in more detail, $\gamma(m,j)$ is adapted by the weight adapting unit 20 as well as the weights $W_k(m)$. The parameter $\beta$, which is included in Metric_Delay$_n$(m) defined in equation (18), is a fixed value specifying the priority of the services. As noted above, for each group j of UEs with the same delay tolerance, the service weight $\beta_j$ is assigned which is not subject to adaptation.

The value of $\gamma(m, j)$ which is used in equation (19) is chosen according to the group to which UE$_n$ belongs. Thus, if UE27 belongs to group 2, the final term of equation (19) for calculating Ranking_Metric$_{27}$ becomes $(1+W_5(m) \cdot \gamma(m,2) \cdot \text{Metric\_Delay}_{27}(m))$.

A second weighted combination of the first measures for each UE in this embodiment is calculated as follows:

$$\text{Channel\_Allocation\_Metric}_n = (1 + V_1(m) \cdot \text{Metric\_QoS}_n(m)) \cdot \qquad (20)$$
$$(1 + V_2(m) \cdot \text{Metric\_C/I}_n(m)) \cdot (1 + V_3(m) \cdot \text{Metric\_Oct}_n(m)) \cdot$$
$$(1 + V_4(m) \cdot \text{Metric\_Waiting\_Ratio}_n(m)) \cdot$$
$$(1 + V_5(m) \cdot \gamma(m, j) \cdot \text{Metric\_Delay}_n(m))$$

where $V_k(m)$ represents a second set of k weights (channel allocation units) at the mth TTI.

Figure 5:
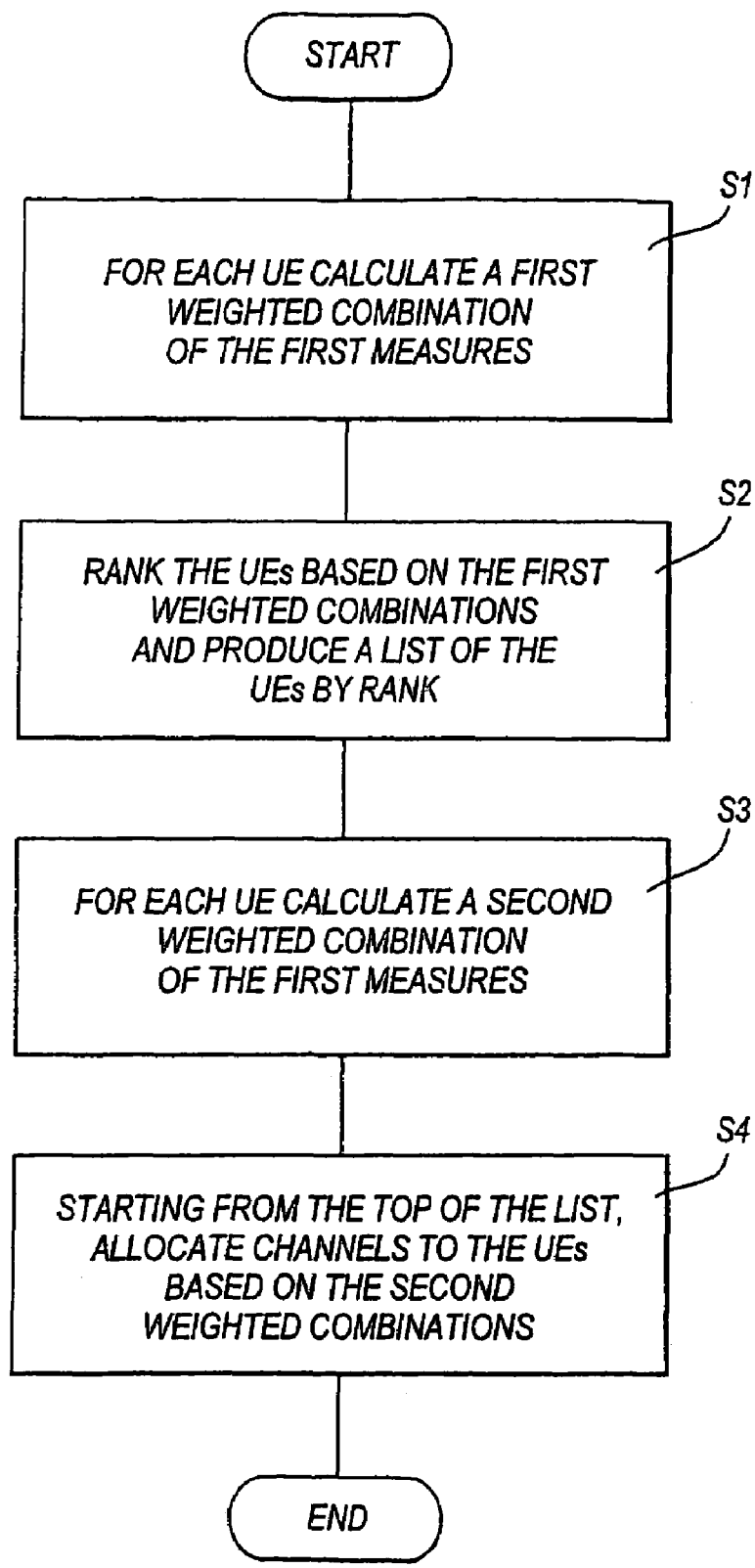
FIG. 5 is a flowchart illustrating operation of a preferred embodiment of the present invention.

FIG. 5 is a flowchart for explaining an example of the operation of the decision unit 16 in the FIG. 4 apparatus in the present embodiment. The series of steps shown in FIG. 5 is carried out for every scheduling instant (eg TTI) under consideration.

In a first step S1 the decision unit 16 calculates for each UE the first weighted combination of the first measures for the UE concerned (ranking metric) according to equation (19). The first measures are weighted using the current values of the first set of weights (ranking weights) $W_k(m)$ when producing this first weighted combination.

In step S2 the decision unit 16 ranks the UEs based on their respective ranking metrics. The decision unit produces a list of the UEs by rank, with the highest-ranked UE at the top of the list. The list only includes UEs which have data waiting in a source queue at the transmitter for transmission to the UE concerned.

In step S3, the decision unit 16 calculates for each UE the second weighted combination of the first measures for the UE concerned (channel allocation metric) according to equation (20). The first measures are weighted using the second set of weights (channel allocation weights) $V_k(m)$ when producing the second weighted combination. The channel allocation weights may be different from the ranking weights.

In step S4 the decision unit 16 refers to the list of UEs produced in step S2. Starting from the top of the list, the decision unit 16 allocates channels to the UEs in the list based on their respective channel allocation metrics, as described in more detail with reference to FIG. 6. The processing in step S4 continues until no channel remains for allocation.

This completes the processing for the current scheduling instant (TTI m). The processing is then repeated for the next scheduling instant (TTI m+i).

The channel allocation process in step 54 starts from the top of the list of ranked UEs, and allocates channels according to the relative values of the channel allocation measures produced in equation 20.

This process is illustrated schematically in FIG. 6.

Suppose that the list of UEs contains five UEs in total, with UE 30 at the top of the list, followed by UEs 2, 9, 11 and 17. Also, assume that the channel allocation measure produced by equation 20 for these UEs are 1.5, 4.3, 1.2, 2.0 and 3.2 respectively.

In the first step, the sum of the channel allocation measures for all of the UEs yet to be allocated channels (ie all of the UEs in this case) is calculated to be 12.2. The highest-ranked UE yet to be allocated is UE 30. Its channel allocation measure of 1.5 is then "normalised" relative to the sum of all the channel allocation measures and becomes 0.12. It is assumed in this example that there are ten channels available in total. Accordingly, the normalised channel allocation measure for UE 30 is multiplied by 10 to yield 1.23. This is then rounded down using a "floor function" to produce the final result that UE 30 is allocated one channel. This leaves 9 channels remaining for allocation in subsequent steps. Incidentally, if the final result is less than 1 it is set to 1 in this embodiment so that the minimum channel allocation is 1 channel.

In the second step the sum of the channel allocation measures of the UEs remaining to be allocated (UEs 2, 9, 11 and 17) is recalculated as 10.7. The channel allocation measure 4.3 of the highest-ranked remaining UE (UE 2) is normalised relative to the new sum and becomes 0.40. This is multiplied by the number of remaining channels, ie 9, to produce the result of 3.62 channels, which is rounded down to 3 channels in the final allocation. This leaves 6 channels remaining for the next step. The procedure is followed again in the third step, with the result that UE 9 is allocated 1 channel, leaving 5 channels left over. In the fourth step, it is calculated that UE 11 should also be allocated 1 channel, leaving 4 channels remaining at this stage. Finally, in the fifth step UE 17 is allocated the remaining 4 channels, and the process ends.

It will be appreciated that other channel allocation processes are possible in embodiments of the invention.

In this embodiment, a set of four second measures of scheduling performance is produced. The first of these four second measures of scheduling performance is an overall QoS measure.

For each UE the proportion of throughput which satisfies the individual QoS requirement for the UE concerned was defined in equation (2) above. The second measure relating to overall QoS of the scheduling process is then defined as simply the average of the individual values of Throughput_Satisfy_QoS for the different UEs:

$$\text{Total\_QoS}(m) = \frac{1}{N}\sum_{i=1}^{N}\text{Throughput\_Satisfy\_QoS}_i(m) \qquad (21)$$

Here, as in equations (19) and (20) above, the term "(m)" simply denotes the value of the parameter in the mth TTI.

The second of the four second measures relates to the total throughput to all the UEs for the mth TTI. This total throughput measure is calculated as $$\text{Total\_Th}(m) = \frac{\sum_{i=1}^{N}(Oct_{Received_i}(m))}{\sum_{i=1}^{N}(Oct_{Arrived\_Node\_B_i}(m))} \qquad (22)$$

where $Oct_{Received\ i}(m)$ is the total number of octets delivered to the ith UE in the mth TTI.

The third of the four second measures in this embodiment relates to an average of the throughputs to the different UEs in the mth TTI. This is simply the average of the individual throughputs calculated in equation (11) above:

$$\text{Avg\_Th}(m) = \frac{1}{N}\sum_{n=1}^{N}Th_n(m), \qquad (23)$$

The last of the four second measures relates to fairness. In this embodiment, fairness is considered to be related to the extent of variance of the throughputs to the individual UEs. Starting from equation (11) above, the vector of the individual throughputs is $$\overline{Th}(m)=\{Th_n(m)\}, n=1\ldots N \qquad (24)$$

Defining the variance of vector of individual throughputs as $$var\_Th(m)=var(\overline{Th}(m)) \qquad (25)$$

The fairness is defined as $$\text{Fairness}(m) = \frac{1}{var\_Th(m)} \qquad (26)$$

As will be readily understood, the ranking weights $W_k(m)$ and channel allocation weights $V_k(m)$ used by the decision unit 16 as part of the scheduling process can be expected to have different probable influences on different aspects of the scheduling performance. Depending on the channel conditions and the traffic load, some of the weights are expected with a high probability to contribute to an improvement of a particular second measure, whereas others of them are expected with a high probability to contribute to a deterioration in a particular second measure. The probable influence of each of the five weights in each set of weights in the present embodiment on the four second measures was investigated by incrementing or reducing each of the five weights individually whilst setting all of the other weights in the set to 1. The results of this investigation are presented in Table 1 below.

TABLE 1

| Second measure | Weight | | | | | | | | | |
|---|---|---|---|---|---|---|---|---|---|---|
| | $W_1$ | $W_2$ | $W_3$ | $W_4$ | $W_5$ | $V_1$ | $V_2$ | $V_3$ | $V_4$ | $V_5$ |
| Total_QoS(m) | F | H | H | F | F | F | H | H | F | F |
| Total_Th(m) |  | F | F | H |  |  | F | F | H |  |
| Fairness(m) | F | H | H | F |  | F | H | H | F |  |
| Avg_Th$_n$(m) |  | H |  | F |  |  | H |  | F |  |

In Table 1, a weight is classified as belonging to a friendly class of weights ("F") for a second measure if an increase in that weight is expected with a high probability to result in the second measure improving. A weight is considered to belong to a hostile class of weights ("H") for a second measure if an increase in that weight is expected with a high probability to result in a deterioration of the second measure. Weights which are not expected with any high probability to cause either an improvement or a deterioration in a second measure are classified as belonging to a neutral class (blank in Table 1).

The probable influences of the weights on the second measures can be assessed by considering the first measures (different aspects of scheduling performance) to which those weights correspond, and how these are likely to affect each different second measure.

Consider, for example, the second measure Total_Th(m) relating to overall throughput.

The first measure Metric_C/I$_n$(m) is defined based on the current reported Carrier-to-Interference (C/I) ratios and the first measure Metric_Oct$_n$(m) is defined based on the efficient number of deliverable octets for the nth UE. If the history of the second measure relating to overall throughput reveals a drop in performance, most probably by intensifying the weights $W_2$(m), $W_3$(m), $V_2$(m) and $V_3$(m) associated with these first measures in both ranking and channel assignment processes, total throughput will recover. These weights are therefore classified as friendly. In contrast Metric_Waiting_Ratio$_n$(m) with a high probability counteracts against the total throughput. The weights $W_4$(m) and $V_4$(m) associated with this first measure can be classified as hostile to the total throughput. Reducing these weights with a high probability leads to recovery of throughput. In fact handling $W_2$(m), $W_3$(m), $V_2$(m), $V_3$(m), $W_4$(m) and $V_4$(m) in this way for a couple of TTIs will shift the behaviour of the decision unit towards the behaviour of a Max C/I packet scheduler.

By using the second measures, together with the classifications of the weights, to adapt or tune the weights it is possible to transform the scheduling apparatus to become a more efficient scheduler, i.e. to perform differently in response to different conditions. By producing and adapting the weights using several different second measures, it is possible to achieve a balance amongst the aspects of performance they measure.

An example of the way in which the weights may be adapted will now be described with reference to equations (24) to (64) below.

For each weight (ranking weight and channel allocation weight) two values are maintained and used. The first value is a "real" value which is the value supplied by the weight adapting unit 20 to the decision unit 16 for use by the decision unit to make its decision regarding the receiver(s) to which packets are to be transmitted. This first value is subject to certain prescribed conditions. For example, in this embodiment it must always be greater than or equal to zero, and it must not exceed some predetermined maximum value. The maximum value may, for example, be the highest value in an initial set of weight values supplied by an operator of the apparatus when the apparatus is first activated. Suitable initial sets of weight values have been disclosed in GB 0303859.3.

The second value of each weight is a "virtual" value which is used internally by the weight adapting unit 20 but is not supplied to the decision unit 16. This second value is what the weight adapting unit 20 uses to adjust the weights. In each TTI, new virtual values are calculated from previous virtual values within the weight adapting unit 20. These virtual values are not subject to the prescribed conditions which apply to the real values and are adapted freely. The real values are derived from the virtual values using a mathematical transformation process which ensures that the real values meet the prescribed conditions.

The real values of the ranking weights in the mth TTI are $$\overline{W}(m) = \{W_1(m), W_2(m), W_3(m), W_4(m), W_5(m)\} \quad (24)$$

and the real values of the channel allocation weights in the mth TTI are $$\overline{V}(m) = \{V_1(m), V_2(m), V_3(m), V_4(m), V_5(m)\} \quad (25)$$

Similarly the virtual values of the ranking weights Virtual_$\overline{W}$ for current mth TTI are represented by $$\text{Virtual\_}\overline{W}(m,s) = \{\text{Virtual\_}W_1(m,s), \text{Virtual\_}W_2(m,s),$$
$$\text{Virtual\_}W_3(m,s), \text{Virtual\_}W_4(m,s),$$
$$\text{Virtual\_}W_5(m,s)\} \quad (26)$$

and the virtual values of the channel allocation weights Virtual_$\overline{V}$ are represented by $$\text{Virtual\_}\overline{V}(m,s) = \{\text{Virtual\_}V_1(m,s), \text{Virtual\_}V_2(m,s),$$
$$\text{Virtual\_}V_3(m,s), \text{Virtual\_}V_4(m,s),$$
$$\text{Virtual\_}V_5(m,s)\} \quad (27)$$

A one-to-one relationship between the real and virtual values Virtual_$\overline{W}$(m) and $\overline{W}$(m) is established. For example if $W_1$ is friendly to Total_QoS(m), Virtual_$W_1$ is also friendly to Total_QoS(m).

In the present embodiment, the adaptation of the virtual values of the weights is carried out in a series of four steps in each TTI. The index s in equations (26) and (27) denotes the step number and Virtual_$W_i$(m,s) (or Virtual_$V_i$(m,s)) denotes the virtual value of the weight $W_i$ (or $V_i$) in step s of the mth TTI. The adaptations carried out in the four steps are now described in detail below.

Step 1:

For the first of the second measures, Total_QoS(m), a history of the changes in value of the measure is employed to assess a trend in the measure over the last L TTIs (eg L=100):

$$\text{Decisive\_Total\_QoS}(m) = \sum_{l=1}^{L} [\text{Total\_QoS}(m-l+1) - \text{Total\_QoS}(m-l)] \quad (28)$$

The virtual values of the weights held from the last step (step 4) of the previous TTI (the m−1th TTI) are then adapted in step 1 based on the trend in the first of the second measures Total_QoS(m) and on the classification of the weights in Table 1.

For ranking weights friendly to Total_QoS(m) we have $$\begin{cases} \text{Virtual\_}W_i(m,1) = & \text{Decisive\_Total\_QoS}(m) \leq 0 \\ \text{Virtual\_}W_i(m-1,4) + \varepsilon - & \\ \text{Decisive\_Total\_QoS}(m), & , \\ \text{Virtual\_}W_i(m,1) = & \text{Decisive\_Total\_QoS}(m) > 0 \\ \text{Virtual\_}W_i(m-1,4) & \end{cases} \quad (29)$$

$$i = 1, 4, 5$$

where $\varepsilon$ is a constant real number with a value between 0.001 and 0.01.

For channel allocation weights friendly to Total_QoS(m) weights we have $$\begin{cases} \text{Virtual\_}V_i(m,1) = & \text{Decisive\_Total\_QoS}(m) \leq 0 \\ \text{Virtual\_}V_i(m-1,4) + \varepsilon - & \\ \text{Decisive\_Total\_QoS}(m), & , \\ \text{Virtual\_}V_i(m,1) = & \text{Decisive\_Total\_QoS}(m) > 0 \\ \text{Virtual\_}V_i(m-1,4) & \end{cases} \quad (30)$$

$$i = 1, 4, 5$$

For ranking weights hostile to Total_QoS(m) we have $$\begin{cases} \text{Virtual\_}W_i(m,1) = & \text{Decisive\_Total\_QoS}(m) \leq 0 \\ \text{Virtual\_}W_i(m-1,4) - \varepsilon + & \\ \text{Decisive\_Total\_QoS}(m), & , \\ \text{Virtual\_}W_i(m,1) = & \text{Decisive\_Total\_QoS}(m) > 0 \\ \text{Virtual\_}W_i(m-1,4) & \end{cases} \quad (31)$$

$$i = 2, 3$$

and for channel allocation weights hostile to Total_QoS(m) we have $$\begin{cases} \text{Virtual\_}V_i(m,1) = & \text{Decisive\_Total\_QoS}(m) \leq 0 \\ \text{Virtual\_}V_i(m-1,4) - \varepsilon + & \\ \text{Decisive\_Total\_QoS}(m), & , \\ \text{Virtual\_}V_i(m,1) = & \text{Decisive\_Total\_QoS}(m) > 0 \\ \text{Virtual\_}V_i(m-1,4) & \end{cases} \quad (32)$$

$$i = 2, 3$$

It can be seen that as a result of equations (29) to (32) the virtual values of weights friendly to Total_QoS(m) are increased if that second measure is decreasing or not changing, and are maintained unchanged if that second measure is increasing. The virtual values of weights hostile to Total_QoS(m), on the other hand, are decreased if that second measure is decreasing or not changing, and are maintained unchanged if that second measure is increasing.

There are no neutral values in step 1 in the present example.

Step 2:

In this step the virtual values of the weights are adjusted again in response to a trend in the second measure Var_Th relating to fairness over the last L TTIs. This trend is judged based on $$\text{Decisive\_var\_Th}(m) = \sum_{l=1}^{L} [\text{var\_Th}(m-l+1) - \text{var\_Th}(m-l)] \quad (33)$$

The virtual values of weights friendly to fairness are adapted as $$\begin{cases} \text{Virtual\_}W_i(m,2) = \text{Virtual\_}W_i(m,1) + & \text{Decisive\_var\_Th}(m) \geq 0 \\ \varepsilon + \text{Decisive\_var\_Th}(m), & , \\ \text{Virtual\_}W_i(m,2) = \text{Virtual\_}W_i(m,1) & \text{Decisive\_var\_Th}(m) < 0 \end{cases} \quad (34)$$

$$i = 1, 4$$

and $$\begin{cases} \text{Virtual\_}V_i(m,2) = \text{Virtual\_}V_i(m,1) + & \text{Decisive\_var\_Th}(m) \geq 0 \\ \varepsilon + \text{Decisive\_var\_Th}(m), & , \\ \text{Virtual\_}V_i(m,2) = \text{Virtual\_}V_i(m,1) & \text{Decisive\_var\_Th}(m) < 0 \end{cases} \quad (35)$$

$$i = 1, 4$$

The virtual values of weights hostile to fairness are adapted as $$\begin{cases} \text{Virtual\_}W_i(m,2) = \text{Virtual\_}W_i(m,1) - & \text{Decisive\_var\_Th}(m) \geq 0 \\ \varepsilon - \text{Decisive\_var\_Th}(m), & , \\ \text{Virtual\_}W_i(m,2) = \text{Virtual\_}W_i(m,1) & \text{Decisive\_var\_Th}(m) < 0 \end{cases} \quad (36)$$

$$i = 2, 3$$

and $$\begin{cases} \text{Virtual\_}V_i(m,2) = \text{Virtual\_}V_i(m,1) - & \text{Decisive\_var\_Th}(m) \geq 0 \\ \varepsilon - \text{Decisive\_var\_Th}(m), & , \\ \text{Virtual\_}V_i(m,2) = \text{Virtual\_}V_i(m,1) & \text{Decisive\_var\_Th}(m) < 0 \end{cases} \quad (37)$$

$$i = 2, 3$$

The rest of the weights are neutral and they are left unchanged $$\text{Virtual\_}W_i(m,2) = \text{Virtual\_}W_i(m,1), i \in \text{Neutral Weights} \quad (38)$$

and $$\text{Virtual\_}V_i(m,2) = \text{Virtual\_}V_i(m,1), i \in \text{Neutral Weights} \quad (39)$$

Equations (34) to (37) above differ from the corresponding equations (29) to (32) used in Step 1. This is because the second measure Var_Th relates to variance of the throughputs, i.e. it relates inversely to fairness.

Step 3:

In this step a trend in the second measure Avg_Th relating to average throughput is assessed:

$$\text{Decisive\_Avg\_Th}(m) = \sum_{l=1}^{L} [\text{Avg\_Th}(m-l+1) - \text{Avg\_Th}(m-l)] \quad (40)$$

The virtual values of weights friendly to average throughput are adapted as $$\begin{cases} \text{Virtual\_W}_i(m, 3) = \text{Virtual\_W}_i(m, 2) + \\ \varepsilon - \text{Decisive\_Avg\_Th}(m), & \text{Decisive\_Avg\_Th}(m) \leq 0 \\ \text{Virtual\_W}_i(m, 3) = \text{Virtual\_W}_i(m, 2) & \text{Decisive\_Avg\_Th}(m) > 0 \end{cases}, i = 4 \quad (41)$$

and $$\begin{cases} \text{Virtual\_V}_i(m, 3) = \text{Virtual\_V}_i(m, 2) + \\ \varepsilon - \text{Decisive\_Avg\_Th}(m), & \text{Decisive\_Avg\_Th}(m) \leq 0 \\ \text{Virtual\_V}_i(m, 3) = \text{Virtual\_V}_i(m, 2) & \text{Decisive\_Avg\_Th}(m) > 0 \end{cases}, i = 4 \quad (42)$$

The virtual values of weights hostile to average throughput are adapted as $$\begin{cases} \text{Virtual\_W}_i(m, 3) = \text{Virtual\_W}_i(m, 2) - \\ \varepsilon + \text{Decisive\_Avg\_Th}(m), & \text{Decision\_Avg\_Th}(m) \leq 0 \\ \text{Virtual\_W}_i(m, 3) = \text{Virtual\_W}_i(m, 2) & \text{Decisive\_Avg\_Th}(m) > 0 \end{cases}, i = 2 \quad (43)$$

and $$\begin{cases} \text{Virtual\_V}_i(m, 3) = \text{Virtual\_V}_i(m, 2) - \\ \varepsilon + \text{Decisive\_Avg\_Th}(m), & \text{Decisive\_Avg\_Th}(m) \leq 0 \\ \text{Virtual\_V}_i(m, 3) = \text{Virtual\_V}_i(m, 2) & \text{Decisive\_Avg\_Th}(m) > 0 \end{cases}, i = 2 \quad (44)$$

The rest of the weights are neutral and they are left unchanged:

$$\text{Virtual\_}W_i(m,3) = \text{Virtual\_}W_i(m,2), i \in \text{Neutral Weights} \quad (45)$$

and $$\text{Virtual\_}V_i(m,3) = \text{Virtual\_}V_i(m,2), i \in \text{Neutral Weights} \quad (46)$$

Step 4:

The trend in the second measure Total_Th relating to total throughput is assessed as $$\text{Decisive\_Total\_Th}(m) = \sum_{l=1}^{L} [\text{Total\_Th}(m - l + 1) - \text{Total\_Th}(m - l)] \quad (47)$$

The virtual values of weights friendly to total throughput are adapted as $$\begin{cases} \text{Virtual\_W}_i(m, 4) = \text{Virtual\_W}_i(m, 3) + \\ \varepsilon - \text{Decisive\_Total\_Th}(m), & \text{Decisive\_Total\_Th}(m) \leq 0 \\ \text{Virtual\_W}_i(m, 4) = \text{Virtual\_W}_i(m, 3) & \text{Decisive\_Total\_Th}(m) > 0 \end{cases}, i = 2, 3 \quad (48)$$

and $$\begin{cases} \text{Virtual\_V}_i(m, 4) = \text{Virtual\_V}_i(m, 3) + \\ \varepsilon - \text{Decisive\_Total\_Th}(m), & \text{Decisive\_Total\_Th}(m) \leq 0 \\ \text{Virtual\_V}_i(m, 4) = \text{Virtual\_V}_i(m, 3) & \text{Decisive\_Total\_Th}(m) > 0 \end{cases}, i = 2, 3 \quad (49)$$

The virtual values of weights hostile to total throughput are adapted as $$\begin{cases} \text{Virtual\_W}_i(m,4) = \text{Virtual\_W}_i(m,3) - \\ \varepsilon + \text{Decisive\_Total\_Th}(m), & \text{Decisive\_Total\_Th}(m) \leq 0 \\ \text{Virtual\_W}_i(m,4) = \text{Virtual\_W}_i(m,3) & \text{Decisive\_Total\_Th}(m) > 0 \end{cases}, i=4 \quad (50)$$

and $$\begin{cases} \text{Virtual\_V}_i(m,4) = \text{Virtual\_V}_i(m,3) - \\ \varepsilon + \text{Decisive\_Total\_Th}(m), & \text{Decisive\_Total\_Th}(m) \leq 0 \\ \text{Virtual\_V}_i(m,4) = \text{Virtual\_V}_i(m,3) & \text{Decisive\_Total\_Th}(m) > 0 \end{cases}, i=4 \quad (51)$$

The neutral weights are left unchanged $$\text{Virtual\_}W_i(m,4) = \text{Virtual\_}W_i(m,3), i \in \text{Neutral Weights} \quad (52)$$

and $$\text{Virtual\_}V_i(m,4) = \text{Virtual\_}V_i(m,3), i \in \text{Neutral Weights} \quad (53)$$

At this stage the virtual values are used to update the real values. To do that first the minimum virtual value is determined as $$\text{Virtual}_{min} = \min(\text{Virtual\_}W_i(m,4), i=1 \ldots 5, \text{Virtual\_} V_i(m,4), i=1 \ldots 5) \quad (54)$$

A further adjustment is carried out on the virtual values to make them positive:

$$\begin{cases} \text{Virtual2\_W}_i(m) = \text{Virtual\_W}_i(m,4) - 2 \cdot \text{Virtual}_{min}, \text{Virtual2\_V}_i = \text{Virtual\_V}_i(m,4) - 2 \cdot \text{Virtual}_{min} & i=1 \cdots 5, \text{Virtual}_{min} < 0 \\ \text{Virtual2\_W}_i(m) = \text{Virtual\_W}_i(m,4), \text{Virtual2\_V}_i = \text{Virtual\_V}_i(m,4), & i=1 \cdots 5, \text{Virtual}_{min} \geq 0 \end{cases} \quad (55)$$

where $\text{Virtual2\_W}_i(m)$ and $\text{Virtual2\_V}_i(m)$ are the adjusted positive values.

Next, the maximum of these adjusted positive values is found:

$$\text{Virtual}_{max} = \max(\text{Virtual2\_}W_i, i=1 \ldots 5, \text{Virtual2\_} V_i, i=1 \ldots 5) \quad (56)$$

As mentioned previously, in this embodiment no weight is permitted to have a real value exceeding a maximum weight in an initial set of weights applied, for example, by an operator:

$$\text{max\_initial\_weight} = \max(W_i(1), i=1 \ldots 5, V_i(1), i=1 \ldots 5) \quad (57)$$

Then for the real values of the weights we have $$W_i(m) = \text{Virtual2\_}W_i(m) \cdot \text{max\_initial\_weight} / \text{Virtual}_{max} \; i=1 \ldots 5 \quad (58)$$

and $$V_i(m) = \text{Virtual2\_}V_i(m) \cdot \text{max\_initial\_weight} / \text{Virtual}_{max} \; i=1 \ldots 5 \quad (59)$$

The mathematical transformations introduced from (54) to (59) put a limit on the growth of the real values of the weights and prevent divergence in one or some of performance measures of QoS provisioning. These formulae are derived through extensive experimental studies.

Referring back to equations (19) and (20) it can be seen that the decision unit 16 also employs an adaptive further weight $\gamma(m, j)$ relating to delay tolerance. There is such an adaptive weight $\gamma(m, j)$ per group j of UEs which have the same delay tolerance. These per-group adaptive weights $\gamma(m, j)$ are also adapted by the weight adapting unit 20. For each group j a measure $\text{Avg\_Group\_QoS}(m, j)$ of the average quality of service experienced in the mth TTI by the UEs belonging to the group is calculated as $$\text{Avg\_Group\_QoS}(m, j) = \frac{1}{N_j} \sum_{i=1}^{N_j} \text{Throughput\_Satisfy\_QoS}_i(m), \quad (60)$$

$$j = 1 \cdots J$$

where $N_j$ is the number of UEs in group j and Throughput_Satisfy_QoS is calculated for each UE in the group according to equation (2) above.

A trend of the average group quality of service for each group j over the last L TTIs is then assessed as $$\text{Decisive\_Avg\_Group\_QoS}(m, j) = \quad (61)$$

$$\sum_{l=1}^{L} [\text{Avg\_Group\_QoS}(m-l+1, j) - \text{Avg\_Group\_QoS}(m-l, j)]$$

This trend is then employed to calculate a parameter $\omega(m, j)$ as follows $$\begin{cases} \omega(m, j) = \gamma(m-1, j) + \varepsilon - \\ \text{Decisive\_Avg\_Group\_QoS}(m, j), & \text{Decisive\_Avg\_Group\_QoS}(m, j) \leq 0 \\ \omega(m, j) = \gamma(m-1, j) & \text{Decisive\_Avg\_Group\_QoS}(m, j) > 0 \end{cases} \quad (62)$$

The per-group adaptive QoS weights γ(m, j) are then updated as $$\gamma(m,j) = \omega(m,j)/\omega_{min}(m), j=1 \ldots J \quad (63)$$

where $$\omega_{min}(m) = \min(\omega(m,j)), j=1 \ldots J \quad (64)$$

The transformations introduced from (62) to (64) guarantee that all the UEs get positive values of group QoS weights γ(m, j) while the group with lowest priority of service always gets a weight value of 1. The transformations also try to avoid unlimited growth of the group QoS weights γ(m, j). These mappings are preferable to prevent divergence in the performance measures related to individual QoS of UEs and those related to overall QoS. These transforms are derived and verified experimentally.

At this stage all the weights have been updated for the mth TTI. They can be applied to the decision unit to enable it to produce the ranking and channel allocation metrics defined in (19) and (20). The steps in the flowchart of FIG. 5 may then be carried out by the decision unit.

Figure 7:
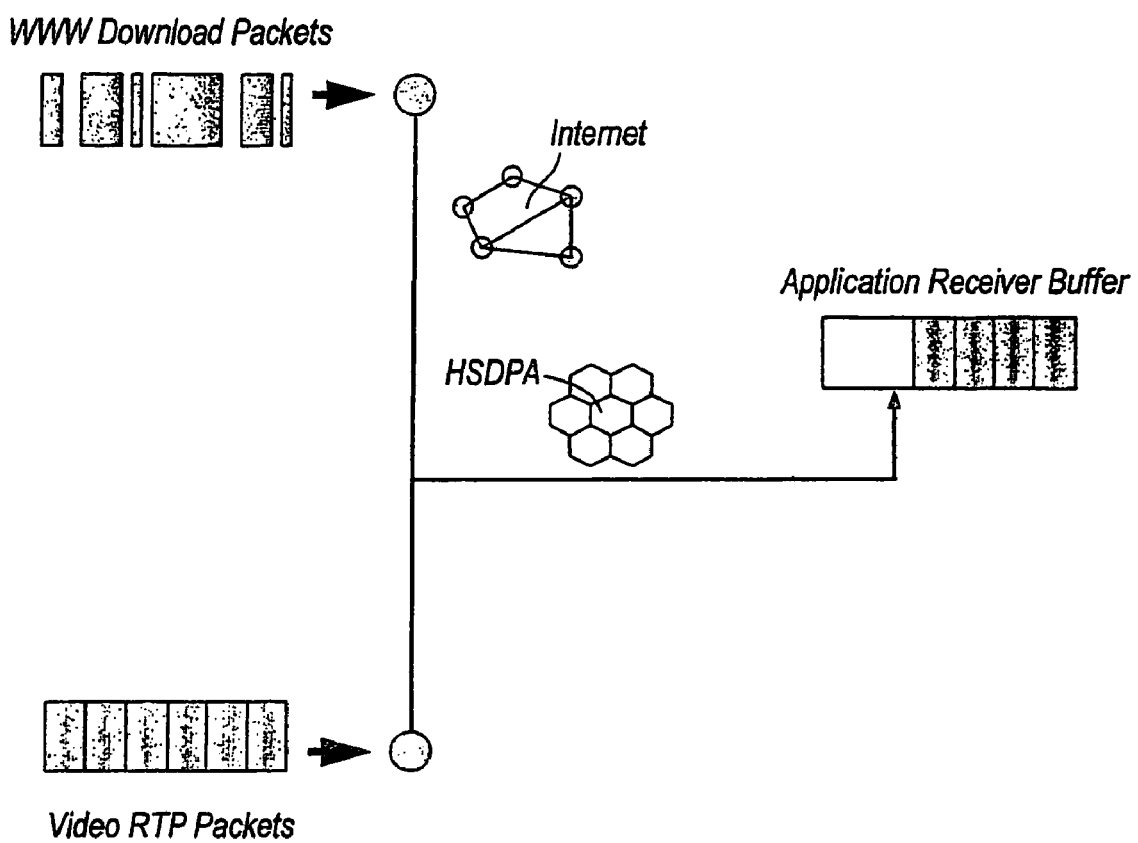
FIG. 7 is a schematic diagram for use in explaining a mixed-service traffic scenario in an HSDPA system.

Next, various simulation results for a preferred embodiment of the invention are provided. These simulation results relate to a simulated traffic environment in which there are multiple UEs. A first group of these UEs are assumed to be attempting to receive real-time video data and a second group of UEs are assumed to be attempting WWW browsing sessions. This scenario is illustrated schematically in FIG. 7. As shown in FIG. 7, WWW download packets are delivered to an application receiver buffer in a UE via the Internet and via an HSDPA system. Real-time video is delivered to the UE's application receiver buffer via the HSDPA system directly.

The real-time video data is made up of real time protocol (RTP) packets. In the present simulation, a video traffic model confirming to ITU H.263 is employed. This traffic model concentrates on the traffic characteristics related to video encoding and RTP packet transport. The model generates 7.5 video frames per second with a target bit rate of the output video stream of 32 kbps. The video frames are segmented into one or several RTP packets, depending on the size of the video frame.

WWW browsing sessions are considered to consist of a sequence of packet calls as defined in TR 25.848, ver 1.0.0, RP-010191, TSG-RAN#11, March 2001. A slowing mechanism is assumed to be applied to the WWW browsing sessions. This slowing mechanism prevents the downloading of a new session unless a previous session has been successfully downloaded completely. For example, if a first web page has a link to a second web page, the slowing mechanism would not permit the second page to be downloaded until all of the first page had been successfully downloaded.

The real-time video data and WWW data share the same channelisation codes (channels) in the HSDPA system.

Figure 8:
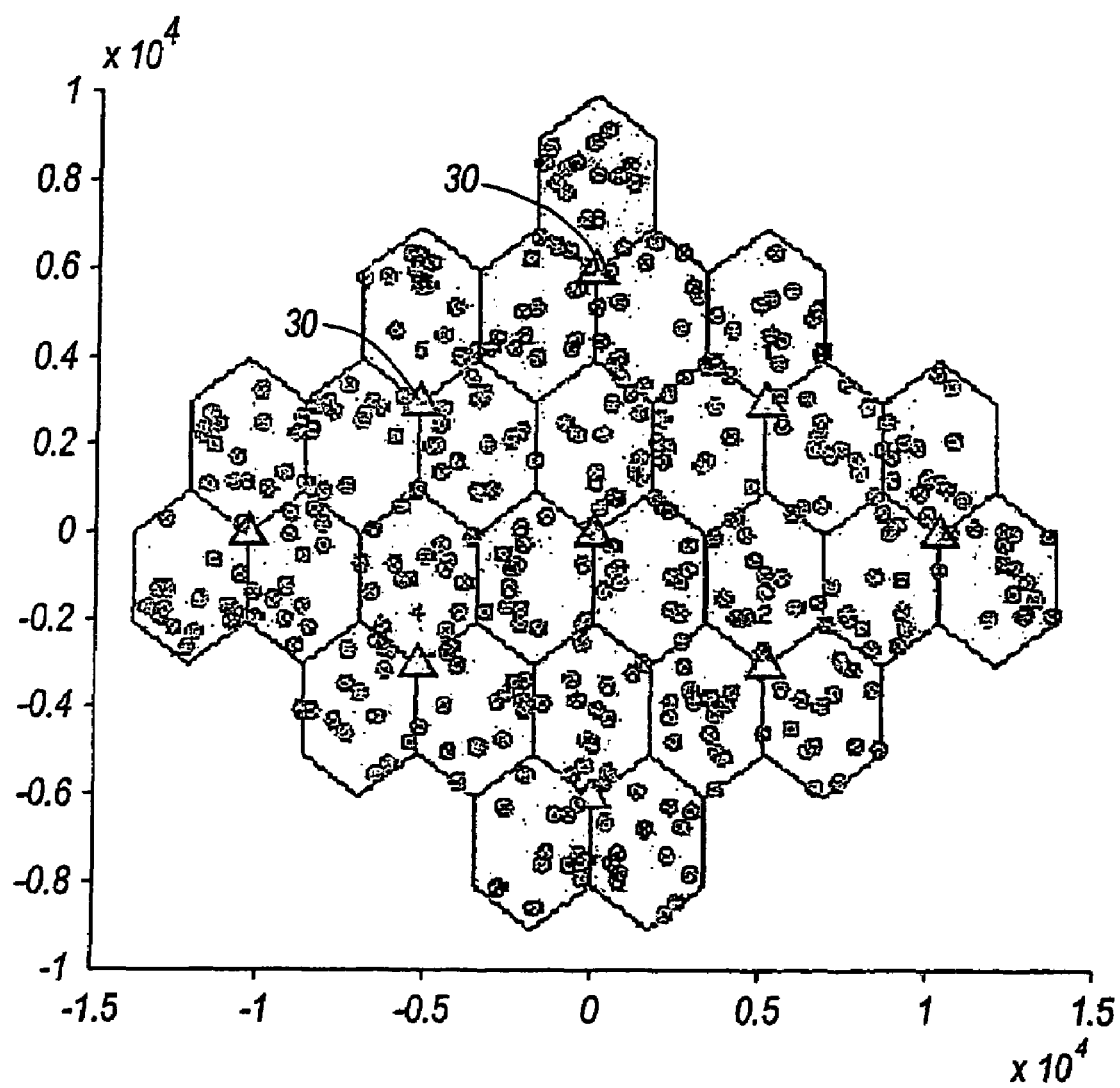
FIG. 8 is a schematic view for use in explaining a cellular environment in an HSDPA system.

The cellular environment which is assumed in the present simulation is illustrated schematically in FIG. 8. In FIG. 8 the spacing between adjacent base stations (Node-Bs) 30 is assumed to be 6 km. There is a base station for each cell. Each cell is divided up into three sectors, and the sector boundaries are shown in FIG. 8. As illustrated in FIG. 8, it is assumed that the UEs are initially distributed uniformly across the cells and that they then move around.

It is also assumed in relation to the cellular environment that the Node-Bs have fixed transmission powers. This is a realistic assumption for a fully-loaded HSDPA system which does not employ power control. Adjacent cell interference is the result of transmissions from adjacent Node-Bs. The level of adjacent cell interference is determined based on the fixed power levels from transmitting Node-Bs. Another assumption is that path loss is present and affects the signal quality. It is also assumed that one packet scheduling apparatus embodying the present invention is provided per sector to handle the data for all of the UEs in that sector.

To model the impact of Rayleigh fading, an ETSI 6-path Rayleigh vehicular A channel model is employed. It is assumed that the speed of each UE is 3.6 km/h. Table 2 below illustrates the relative delay and average power of the six different paths assumed to make up the channel.

TABLE 2

| | Channel A | |
|---|---|---|
| Path | Rel. Delay (nS) | Avg. Pwr (dB) |
| 1 | 0 | 0.0 |
| 2 | 310 | −1.0 |
| 3 | 710 | −9.0 |
| 4 | 1090 | −10.0 |
| 5 | 1730 | −15.0 |
| 6 | 2510 | −20.0 |

The shadowing is assumed to have a log-normal distribution. The shadowing parameters that are assumed are set out in Table 3 below.

TABLE 3

| Parameters | Values |
|---|---|
| Log-normal Shadow fading standard deviation | 8 dB |
| Decorrelation Distance | 20 m |
| Correlation between sites | 0.5 |
| Correlation between sectors | 1 |

Figure 9:
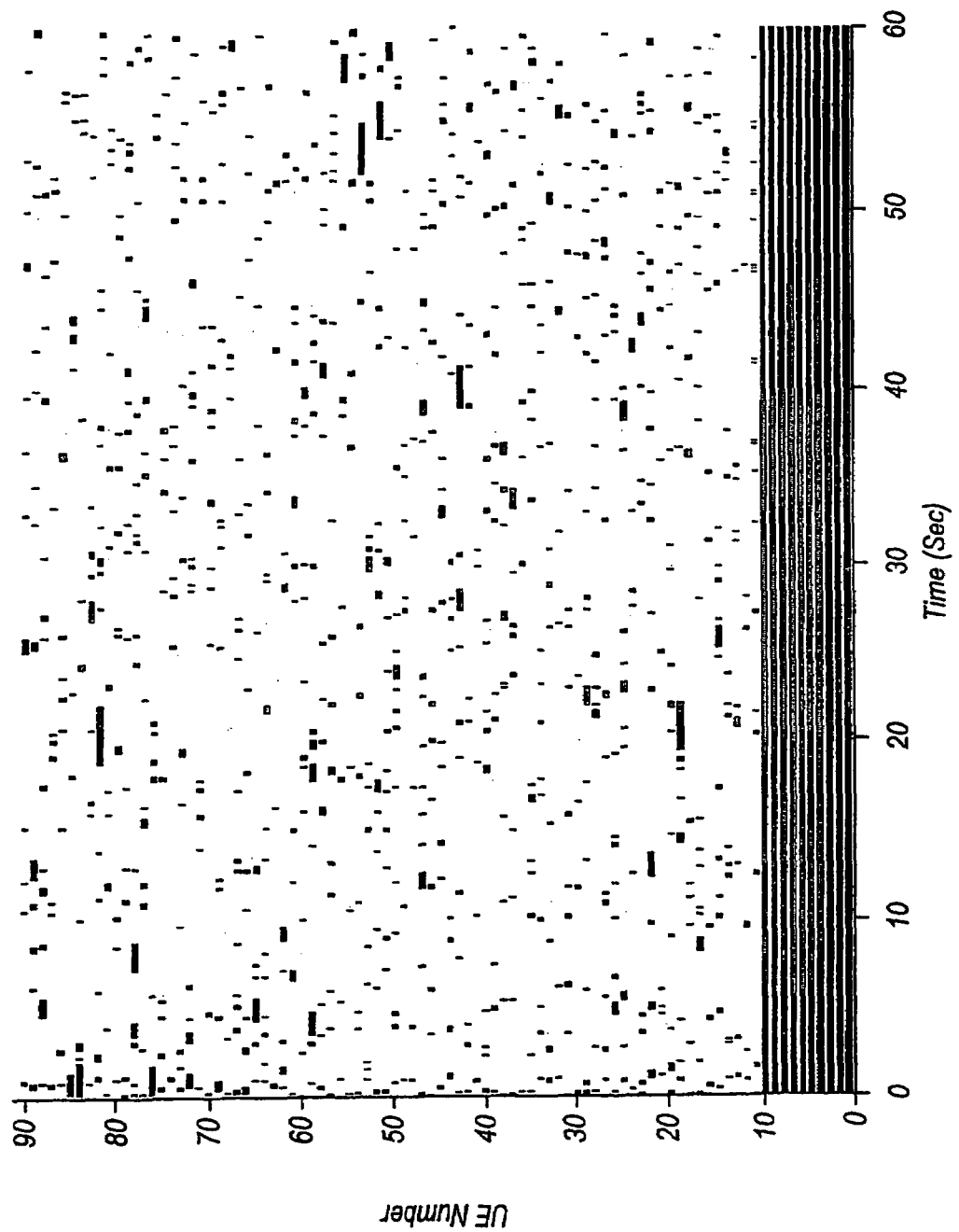
FIG. 9 is a diagram illustrating packet transmission activity in an HSDPA system in a first simulation example.

FIG. 9 shows the assumed packet data arrivals for the different UEs in a first simulated example.

UEs 1 to 10 are video users. UEs 11 to 90 are WWW users. In the first example, the total aggregate traffic load is assumed to be approximately constant over a series of 30,000 TTIs (60 second period). As can be seen from FIG. 9, each video user (UE1 to UE10) has an almost continuous stream of packet arrivals. For WWW users (UE 11 to UE 90), the packet arrivals are discontinuous. However, when data is arriving, the instantaneous data rate may be much larger than the video data rate of 32 kbps. Thus, the aggregate offered load for WWW users is assumed to be large compared to that for video users. In other words, video users have a narrow pipe, whereas WWW users have a wide pipe.

It is assumed that the channel estimation performed by each UE is perfect, and that the feedback signalling is error free. Also, a minimum reporting delay is considered to be 3 TTIs.

It is also assumed that the tolerable delay threshold for WWW sessions is 1.5 seconds. For video services the tolerable delay threshold is assumed to be 100 milliseconds. Chase combining is carried out, and the maximum number of transmissions of a packet is 6. A packet is dropped if it cannot be delivered within 6 retransmissions. It is assumed that video users belong to the service group j=1 and WWW users belong to the service group j=2. In all the following simulations, the service priority parameter $\beta_1$ for video users is fixed at 10, and the service priority parameter for WWW users is fixed at 1. It is also assumed that the trend of the second measures over L=100 TTIs is taken into account, and that ∈=0.001. γ(m, j) is assumed to be 1 for all the UEs.

In the following description with reference to FIGS. 10 to 22, the performance of scheduling apparatus embodying the present invention will be compared with the performance of a conventional FIFO weighted max C/I scheduler and with a previously-considered scheduler described in GB 0303859.3 having fixed weights.

Figure 10:
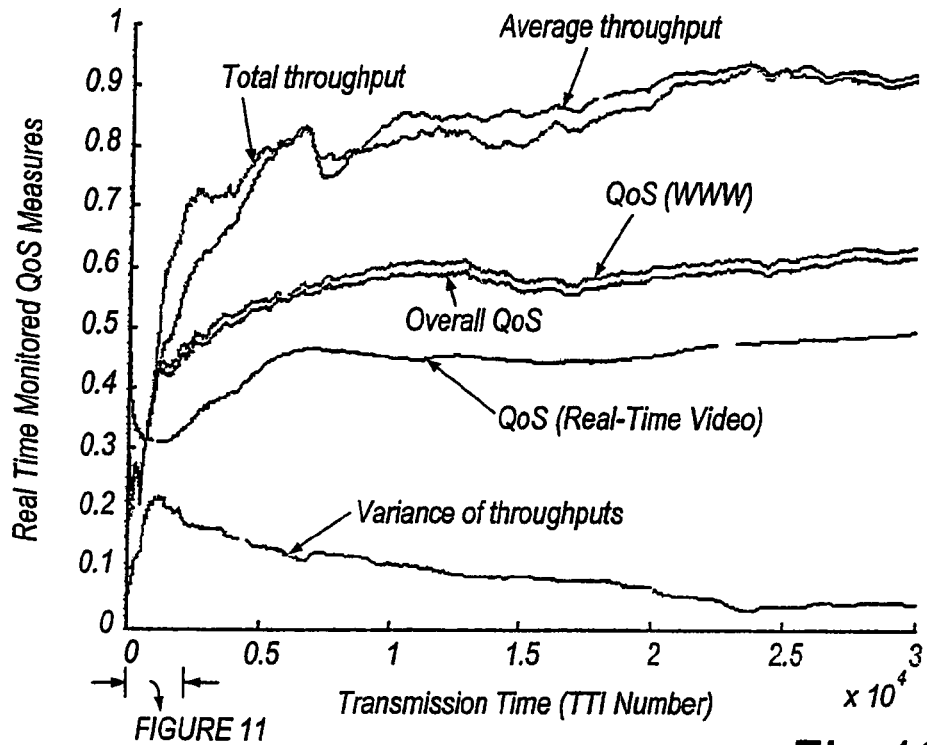
FIG. 10 is a graph illustrating performance of a conventional FIFO weighted max C/I scheduler over a series of transmission time intervals in the first simulation example.
Figure 11:
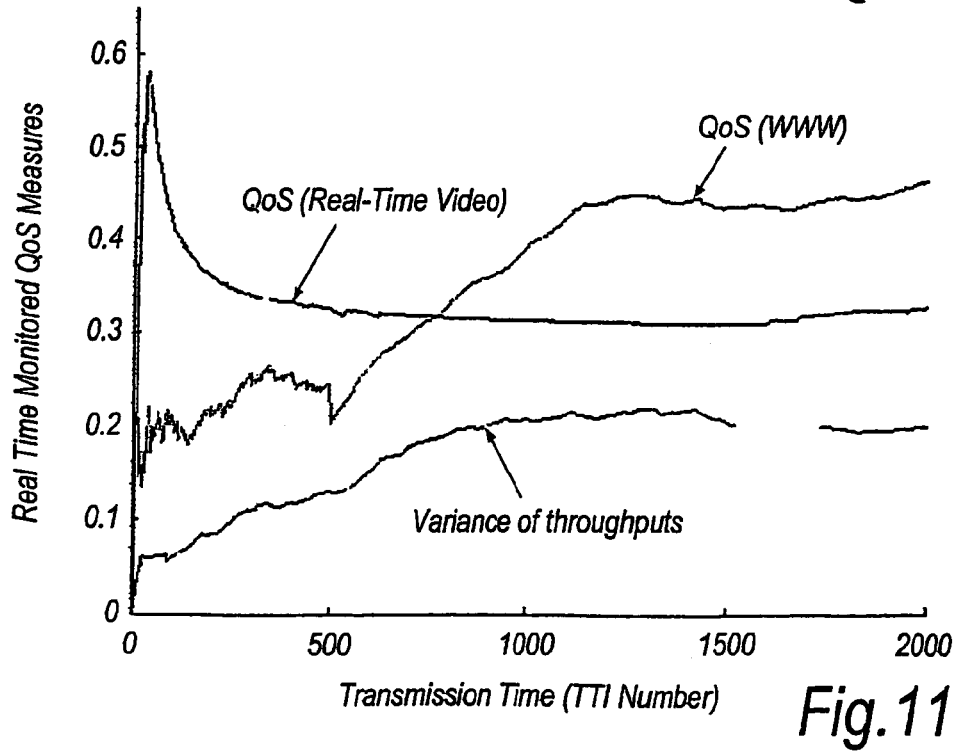
FIG. 11 is a graph corresponding to FIG. 10 but showing the performance over an initial period shown in FIG. 10 in more detail.

Firstly, FIGS. 10 and 11 relate to the performance of the max C/I scheduler under the traffic scenario shown in FIG. 9. FIG. 10 shows how the four second measures defined in equations (21), (22), (23) and (26) vary over the simulation period of 30,000 TTIs. FIG. 10 also shows the variation in the group measures Avg_Group_QoS for video services and for WWW services defined in equation (60).

FIG. 11 is a graph corresponding to FIG. 10 but showing just the variation over the first 2,000 TTIs (or 4 seconds) of the simulation period. It can be seen that, since all the real-time video users and the WWW users share the same channels, the HSDPA system performance in terms of QoS of real-time video and fairness collapses initially in response to the sudden admission of all of the video and WWW calls at the beginning of the simulation period. It can be seen that the QoS of real-time video initially rises to about 0.6 but then the performance deteriorates to around 0.3. The performance recovers later, but this "run-away" phenomenon is unsatisfactory for video users. No such "run-away" phenomenon occurs in the QoS for WWW users, for which the performance is steadily rising over the simulation period.

Figure 12:
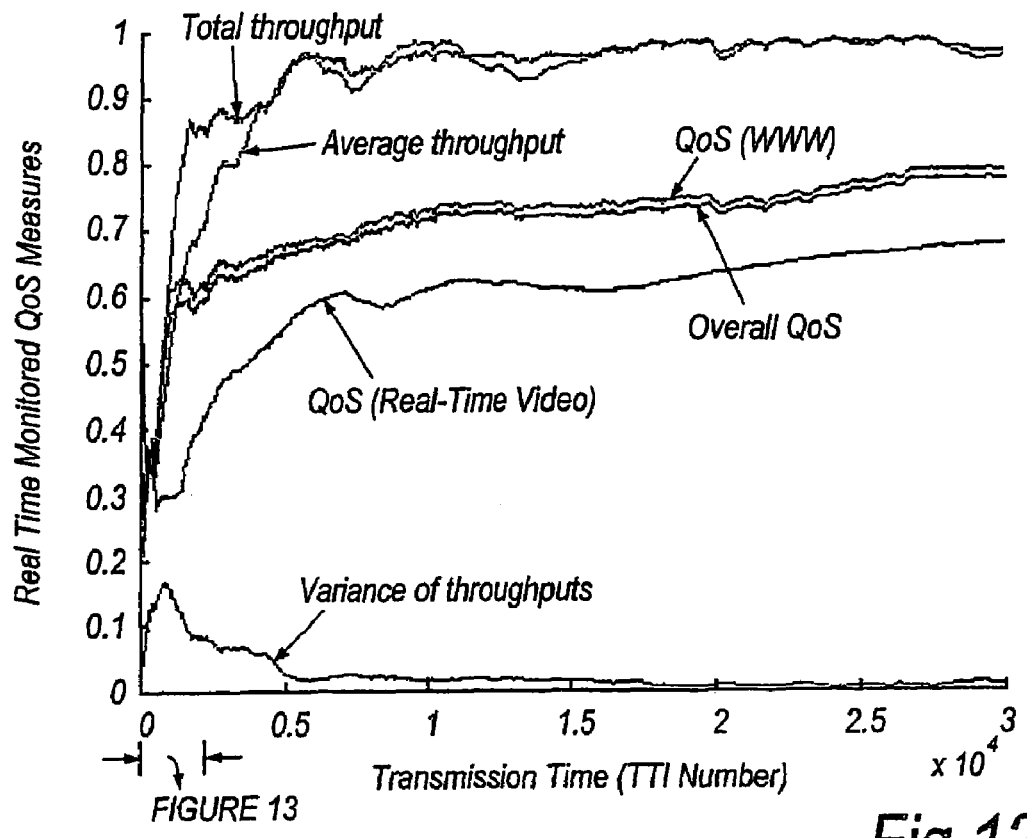
FIG. 12 is a graph illustrating performance of a scheduler described in GB 0303859.3 having roughly-assigned fixed weights over a series of TTIs in the first simulation example.
Figure 13:
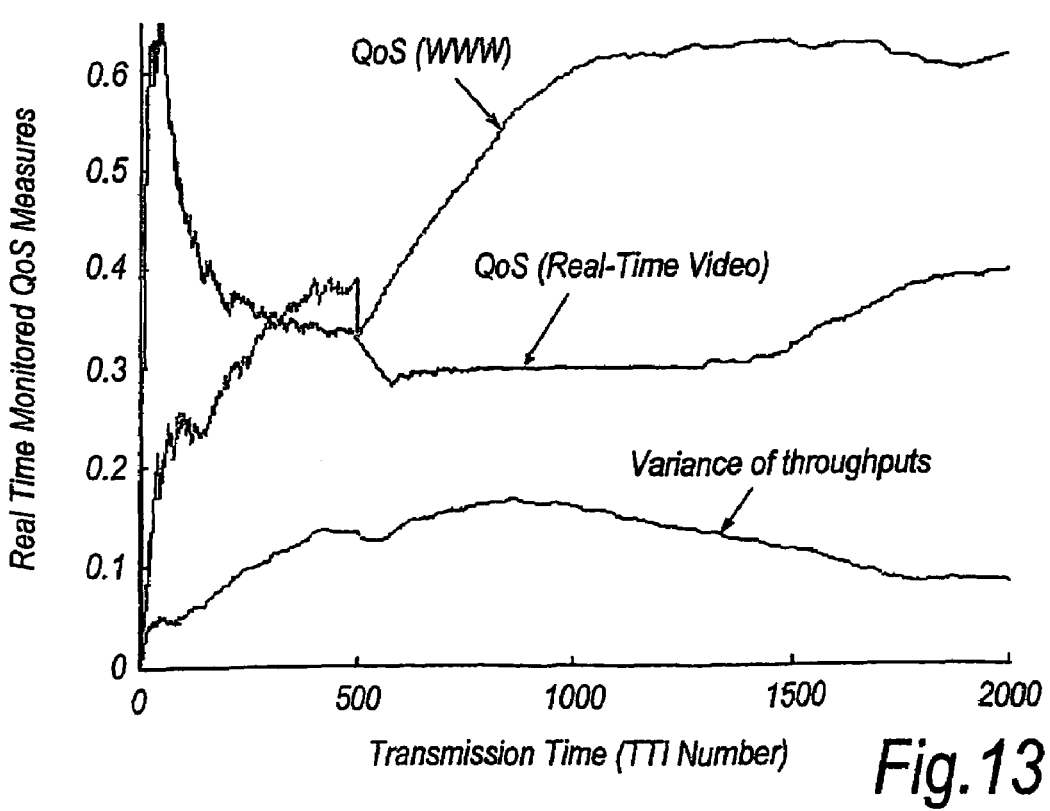
FIG. 13 is a graph corresponding to FIG. 12 but showing performance over an initial period in FIG. 12 in more detail.

Next, FIGS. 12 and 13 present the same information as FIGS. 10 and 11 but for a scheduler as described in GB 0303859.3 having the following set of roughly-assigned fixed weights:

$$W_1(1)=0.1, W_2(1)=10, W_3(1)=0.1, W_4(1)=0.1, W_5(1)=0.1$$

$$V_1(1)=0.1, V_2(1)=0.1, V_3(1)=0.1, V_4(1)=10, V_5(1)=0.1$$

These values are not the optimum values disclosed in GB 0303859.3. Instead, they are deliberately chosen to be non-optimum values because in practice the optimum initialisation of fixed weights in such a scheduler may not be possible.

As FIG. 13 shows, there is still a run-away effect in the first 1,000 TTIs (or two seconds). The QoS of WWW users and the QoS of real-time video users clearly have two opposite trends in FIG. 13. Furthermore, the variance of throughputs is steadily increasing during the first two seconds of the simulation period. It can be seen that the recovery in FIG. 13 is faster than in FIG. 11 (the max C/I scheduler). However, in some circumstances the period of recovery and the final level of achieved stable performance may not be acceptable for real-time video users.

Figure 14:
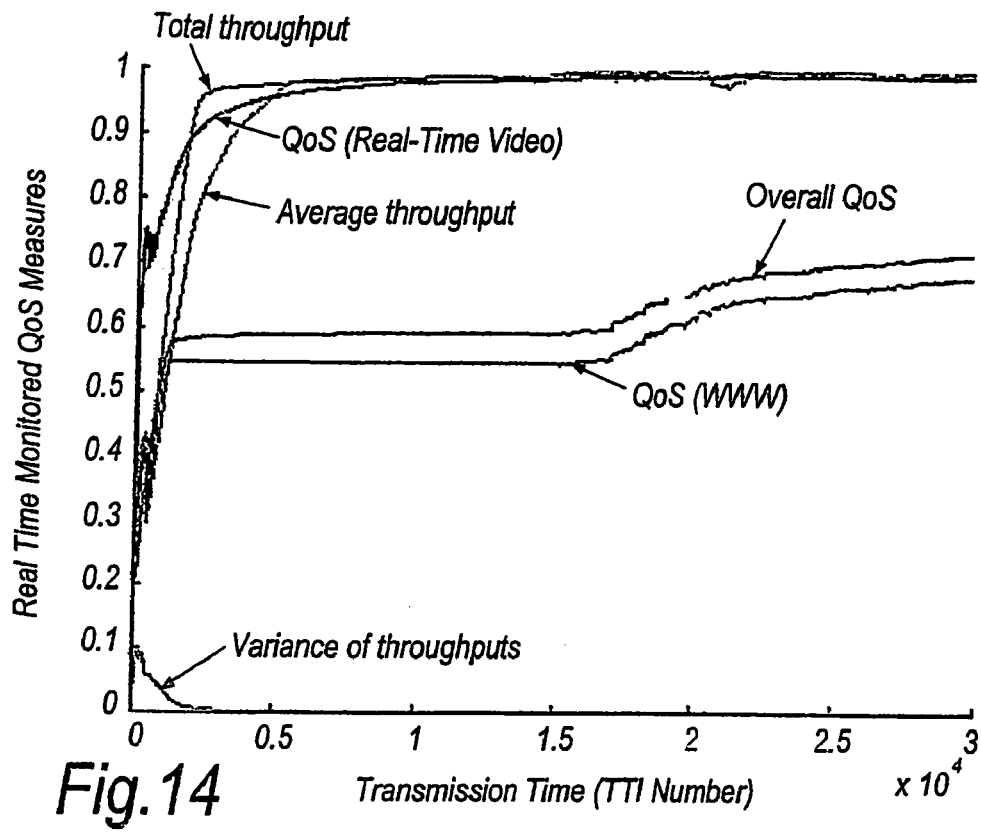
FIG. 14 is a graph illustrating performance of packet scheduling apparatus according to one embodiment of the present invention over a series of TTIs in the first simulation example.

FIG. 14 shows the performance of an embodiment of the present invention in which the weights are adapted starting from the rough initial values set out above. The same performance measures as shown in FIGS. 10 to 13 are illustrated. In this example, however, the transformations of equations (54) to (59) and (62) to (64) are not applied when deriving the real values of the weights from the virtual values. Thus, effectively the virtual values, which are adjusted without limitation, are applied directly to the decision unit 16 in FIG. 4.

From FIG. 14 it can be seen that the QoS of WWW users is significantly lower than the QoS of video users within the first 30 seconds of the simulation period. The flat level of the QoS of WWW users means that within this initial period, the transmissions to video users are almost totally dominant and block any delivery of data to WWW users. This severe output bit pipe imbalance has a direct impact on the final delivered output bit rate which is more than 500 kbps lower than both the conventional FIFO weighted max C/I scheduler and the scheduler of GB 0303859.3 with roughly-assigned fixed weights. It is for this reason that the mathematical transformations (normalisations) of equations (54) to (59) and (62) to (64) are preferable in a mixed-service scenario to provide a balance among all the different aspects of QoS provisioning.

Figure 15:
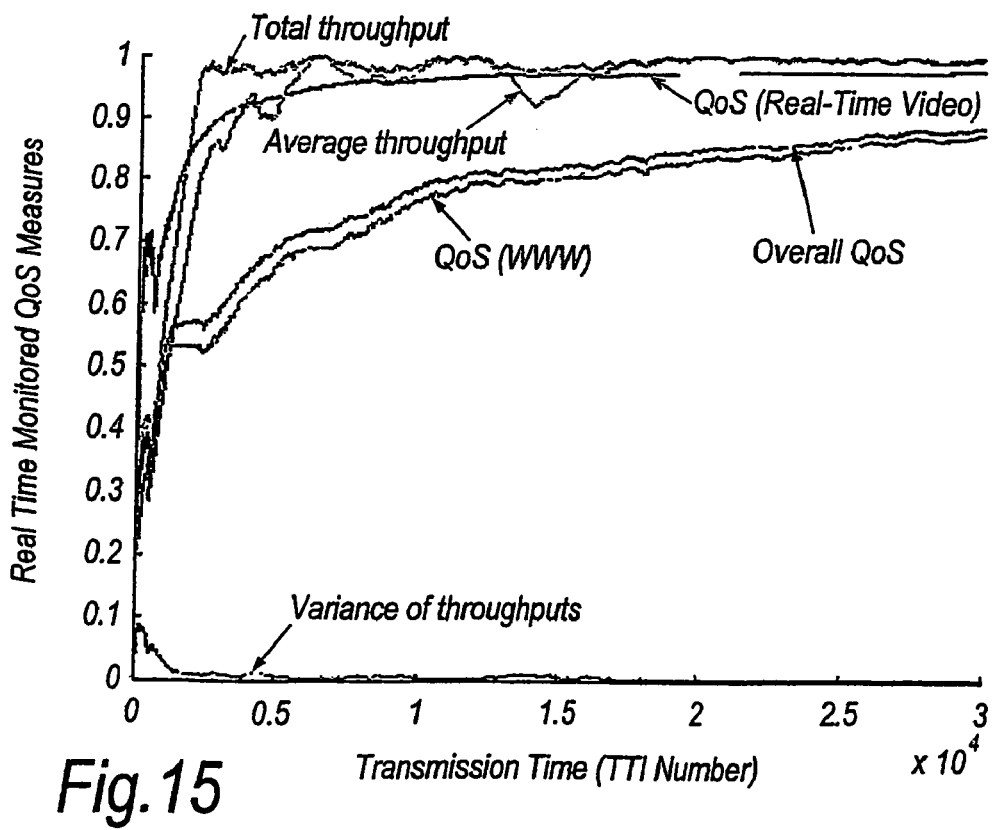
FIG. 15 is a graph illustrating the performance of packet scheduling apparatus according to another embodiment of the present invention over a series of TTIs in the first simulation example.

FIG. 15 shows the performance of a scheduler embodying the present invention when the transformations of equations (54) to (59) and (62) to (64) are applied. It is assumed that the scheduler is initialised with the same set of rough weights used to produce the results shown in FIGS. 12 and 13. The weights are then adapted by the scheduler.

It is evident that the adaptive control mechanism has managed to improve the performance compared to the fixed-weight scheduler disclosed in GB 0303859.3 to a considerable degree (see FIG. 12).

Figure 16:
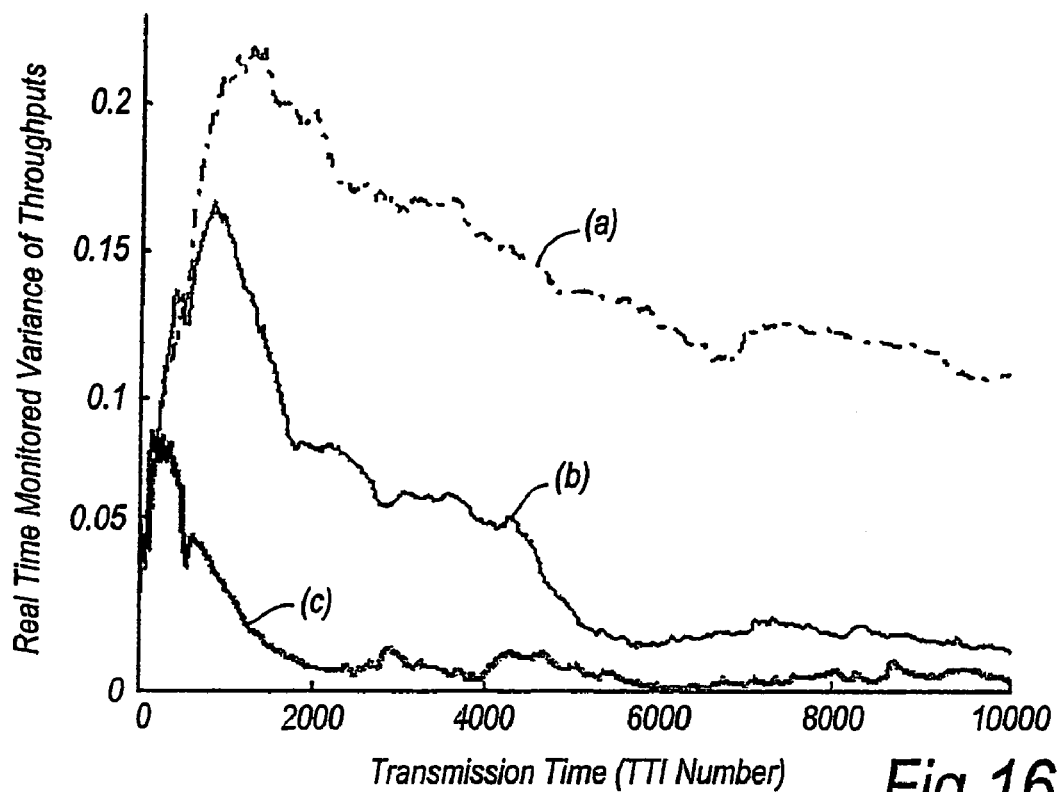
FIG. 16 is a graph illustrating variation of a variance of throughputs to different UEs over a series of TTIs in the first simulation example for packet scheduling apparatus embodying the present invention and other schedulers.

FIG. 16 compares the variance of throughputs over time for (a) a FIFO-weighted max C/I scheduler, (b) the fixed-weight scheduler of GB 0303859.3 with roughly-assigned weights, and (c) a scheduler embodying the present invention. It can be seen that a scheduler embodying the present invention has an efficient fast response to the run-away phenomenon.

Figure 17:
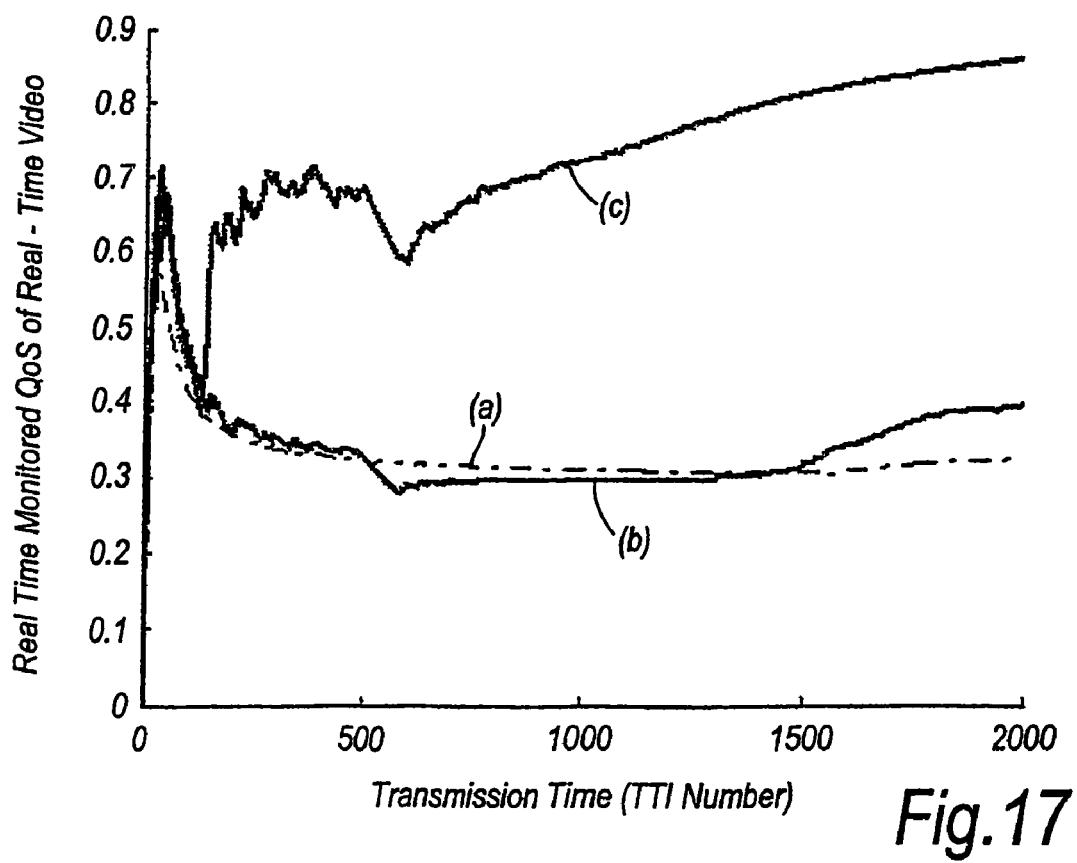
FIG. 17 is a graph illustrating a variation of QoS of UEs receiving real-time video services over an initial period of TTIs in the first simulation example for packet scheduling apparatus embodying the present invention and for other schedulers.

FIG. 17 is a graph comparing the QoS of video users over time for the three different schedulers (a) to (c). Again the efficient fast response to the run-away phenomenon of a scheduler embodying the present invention is evident.

FIGS. 18(A) to 18(F) present other comparisons of performance between the three schedulers (a) to (c).

Figure 18A:
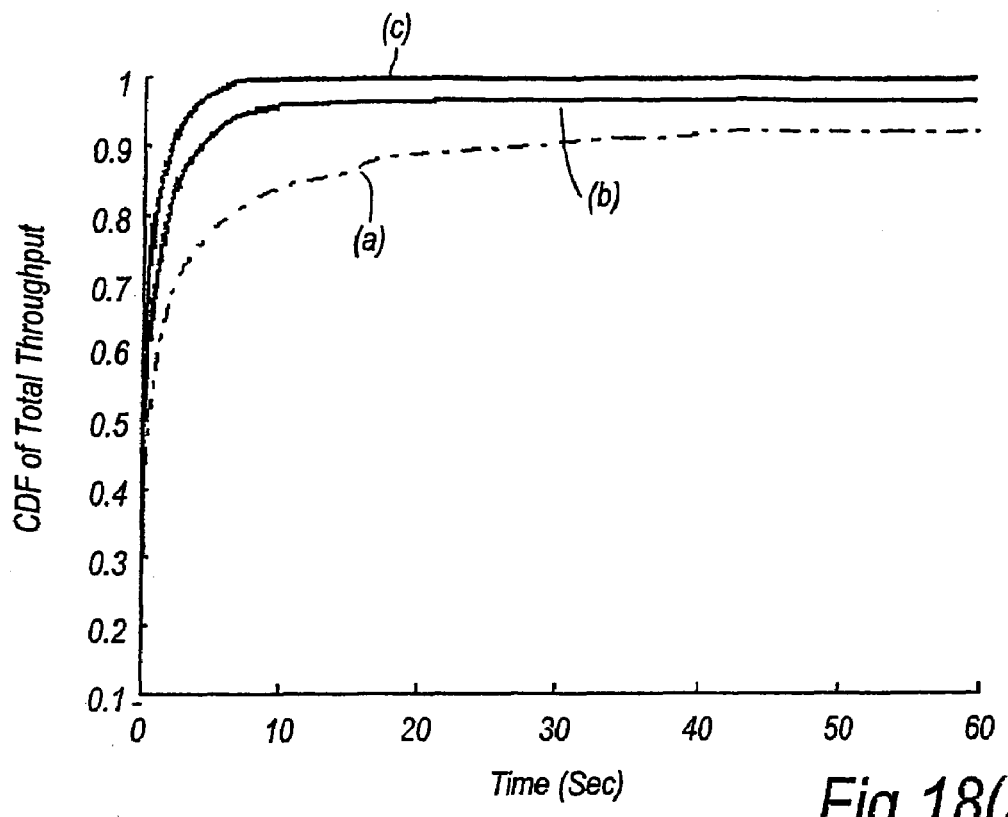
FIGS. 18(A) to 18(F) are graphs for comparing different aspects of performance of packet scheduling apparatus embodying the present invention with other schedulers over a series of TTIs in the first simulation example.

FIG. 18(A) presents a graph for comparing total throughput (WWW and video) in the three schedulers. The lines indicate a cumulative density function (CDF) of the throughputs of all UEs.

Figure 18B:
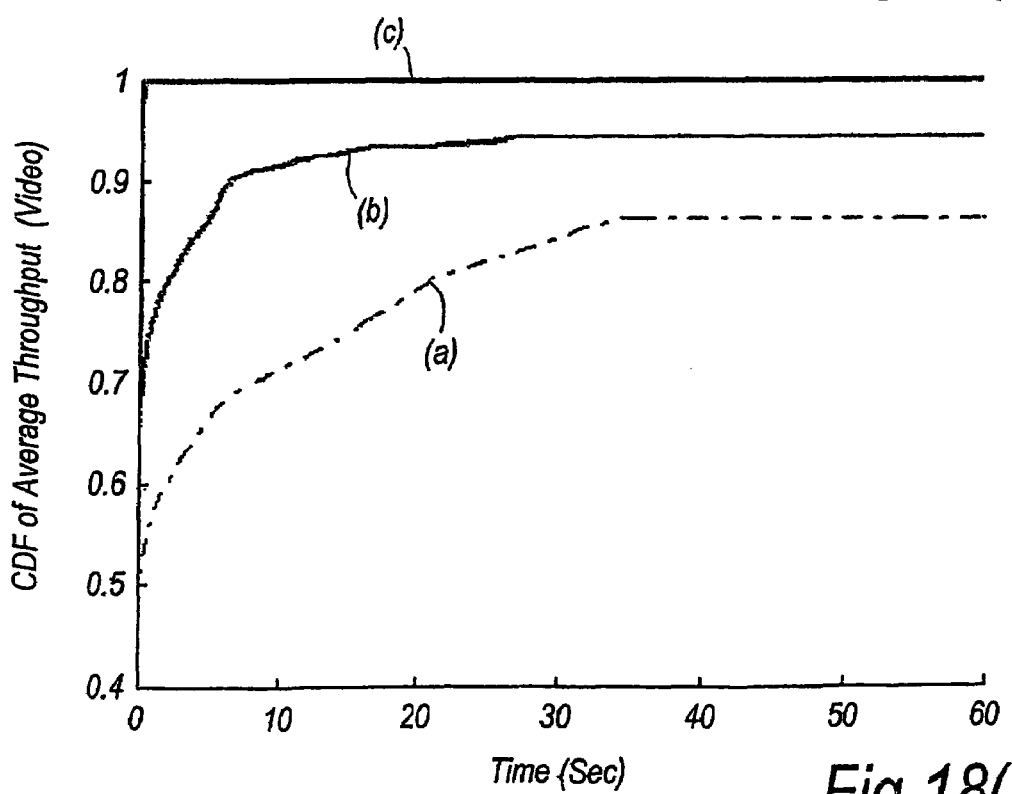

FIG. 18(B) is a graph for comparing average video throughput in the three schedulers. The lines indicate a mean CDF of the throughputs of the UEs 1 to 10 which are receiving video services.

Figure 18C:
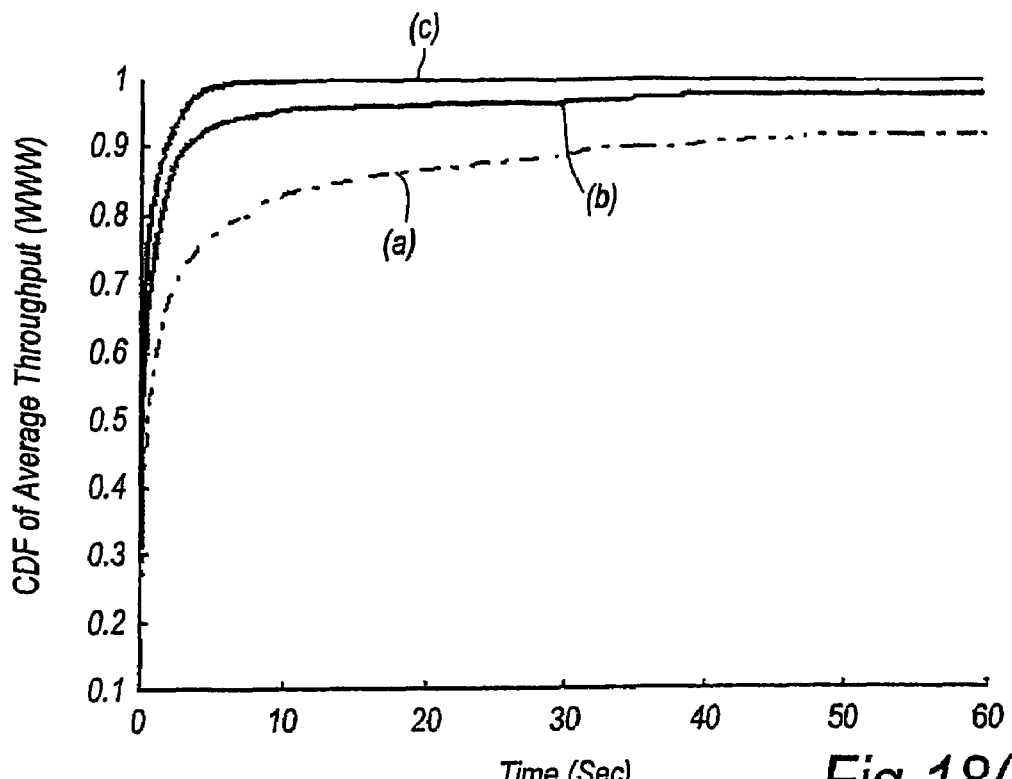

FIG. 18(C) is a graph corresponding to FIG. 18(B) but for comparing average WWW throughput in the three schedulers. The lines indicate a mean CDF of the throughputs of the UEs 11 to 90 which are receiving WWW services.

Figure 18D:
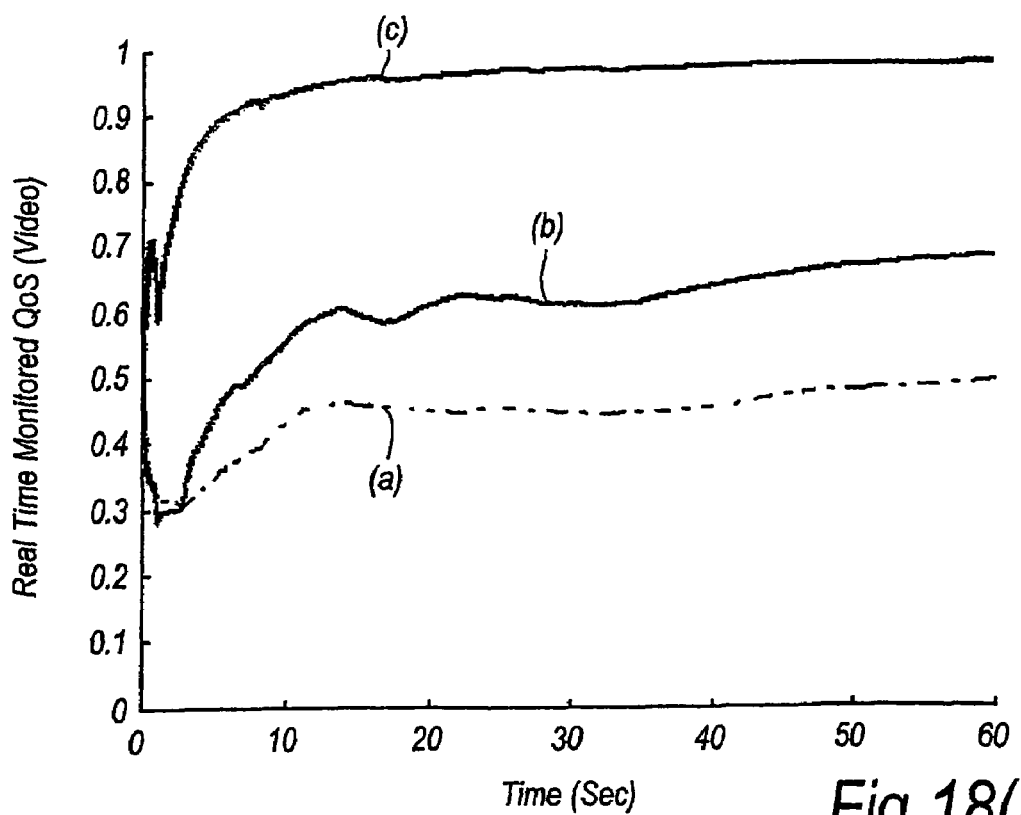

FIG. 18(D) is a graph for comparing the QoS for video users in the three schedulers.

Figure 18E:
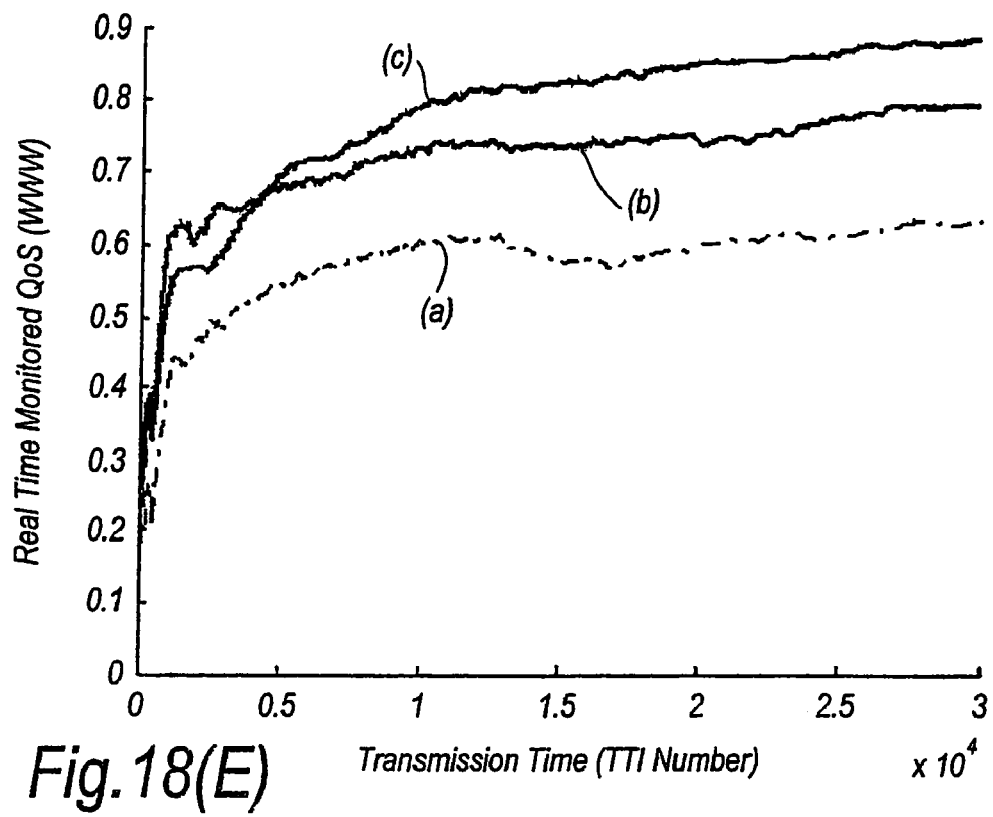

FIG. 18(E) is a graph for comparing the QoS of WWW users in the three schedulers.

Figure 18F:
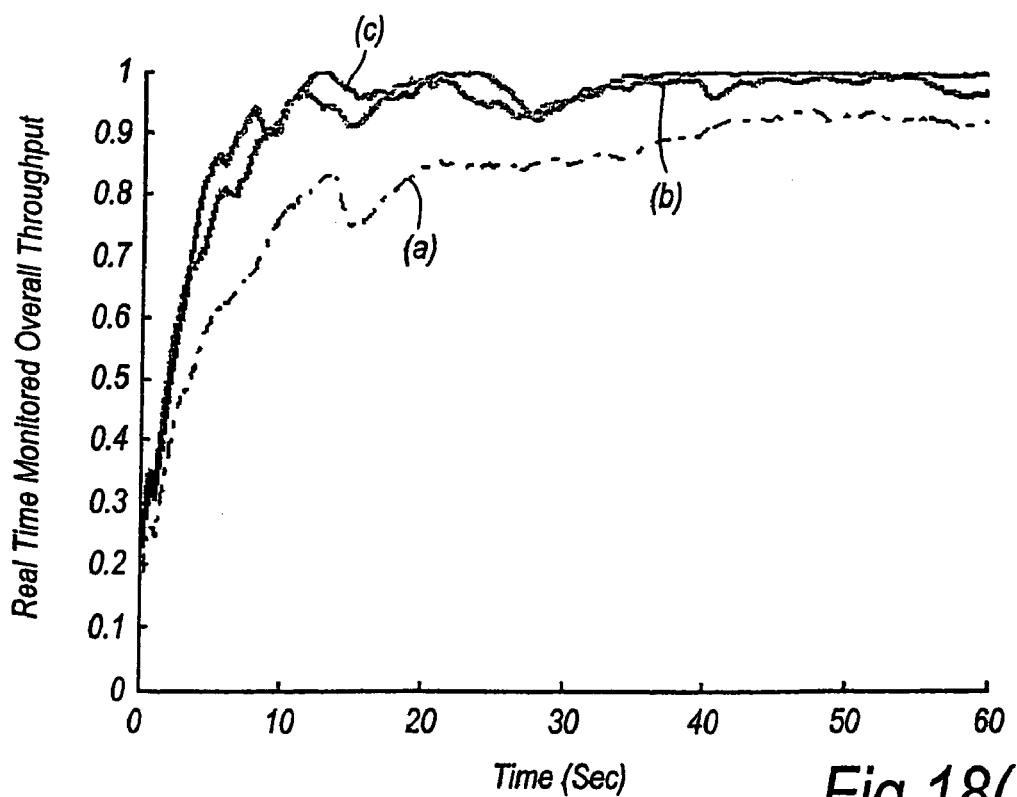

FIG. 18(F) is a graph for comparing overall throughput to all UEs in the three schedulers.

Table 4 below presents the performance comparisons for the first simulation example in quantitative form. The performance comparison measures are delivered bit rate (total throughput over the 30,000 TTIs divided by 60 seconds), average throughput, average delay, QoS for WWW services and QoS for video services. The average throughput is the average of the individual throughputs as defined by equation (23). The average delay is the average of the respective delays experienced by the successfully-delivered packets. The QoS for each service is the ratio of octets delivered error-free to the relevant UEs within the tolerable delay threshold for the service concerned to the total number of octets which arrived at node B.

TABLE 4

| Scheduler | (a) | (b) | (c) |
| --- | --- | --- | --- |
| Delivered Bit Rate | 1.969 Mbps | 2.186 Mbps | 2.1921 |
| Average Throughput | 0.9127 | 0.9731 | 0.998 |
| Average Delay | 4.5966 sec | 1.4563 sec | 0.6071 |

TABLE 4-continued

| Scheduler | (a) | (b) | (c) |
|---|---|---|---|
| Satisfied QoS Conditions (WWW) | 0.6331 | 0.7949 | 0.8758 |
| Satisfied QoS Conditions (Video) | 0.4958 | 0.6814 | 0.9783 |

It can be seen from Table 4 how efficiently the scheduler (c) embodying the present invention improves all the system performance features. It has successfully managed to deliver a fair output for all wireless end-users even over short periods of time.

The set of virtual weight values at the end of the simulation period are:

$$\text{Virtual\_}W_1(30000)=4.79, \text{Virtual\_}W_2(30000)=\\0.4881, \text{Virtual\_}W_3(30000)=38.4451,\\\text{Virtual\_}W_4(30000)=9.6, \text{Virtual\_}\\W_5(30000)=30.87$$

$$\text{Virtual\_}V_1(30000)=4.79, \text{Virtual\_}V_2(30000)=-9.411,\\\text{Virtual\_}V_3(30000)=38.4451, \text{Virtual\_}V_4\\(30000)=4.965, \text{Virtual\_}V_5(30000)=30.87$$

The set of real weight values (optimised and adjusted) at the end of the period are $$W_1(30000)=4.12, W_2(30000)=3.37, W_3(30000)=10,\\W_4(30000)=4.96, W_5(30000)=8.68$$

$$V_1(30000)=4.12, V_2(30000)=/0.64, V_3(30000)=10,\\V_4(30000)=4.96, V_5(30000)=8.68$$

Figure 19A:
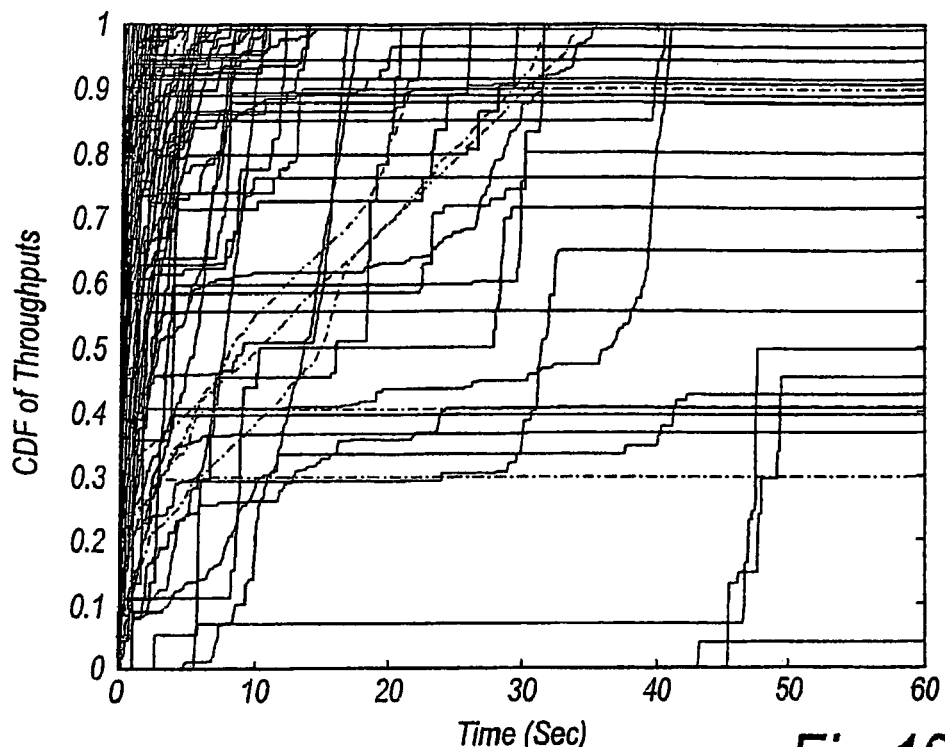
FIGS. 19(A), 19(B) and 19(C) show graphs illustrating a cumulative density function (CDF) of throughputs of all UEs over time in the first simulation example for packet scheduling apparatus embodying the present invention and for other schedulers.
Figure 19B:
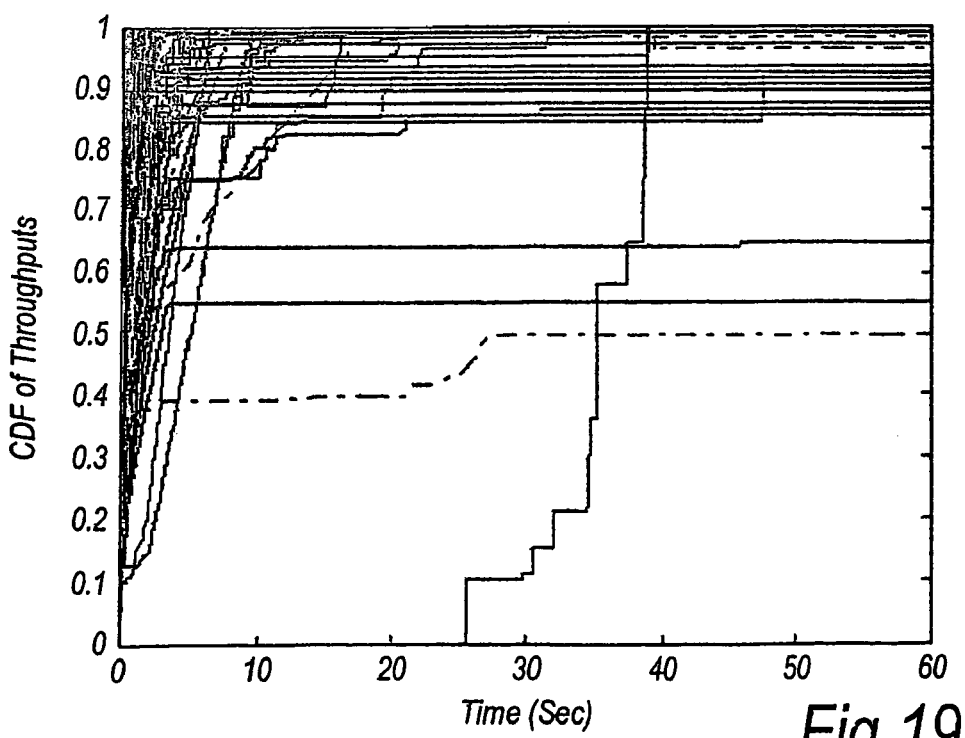
Figure 19C:
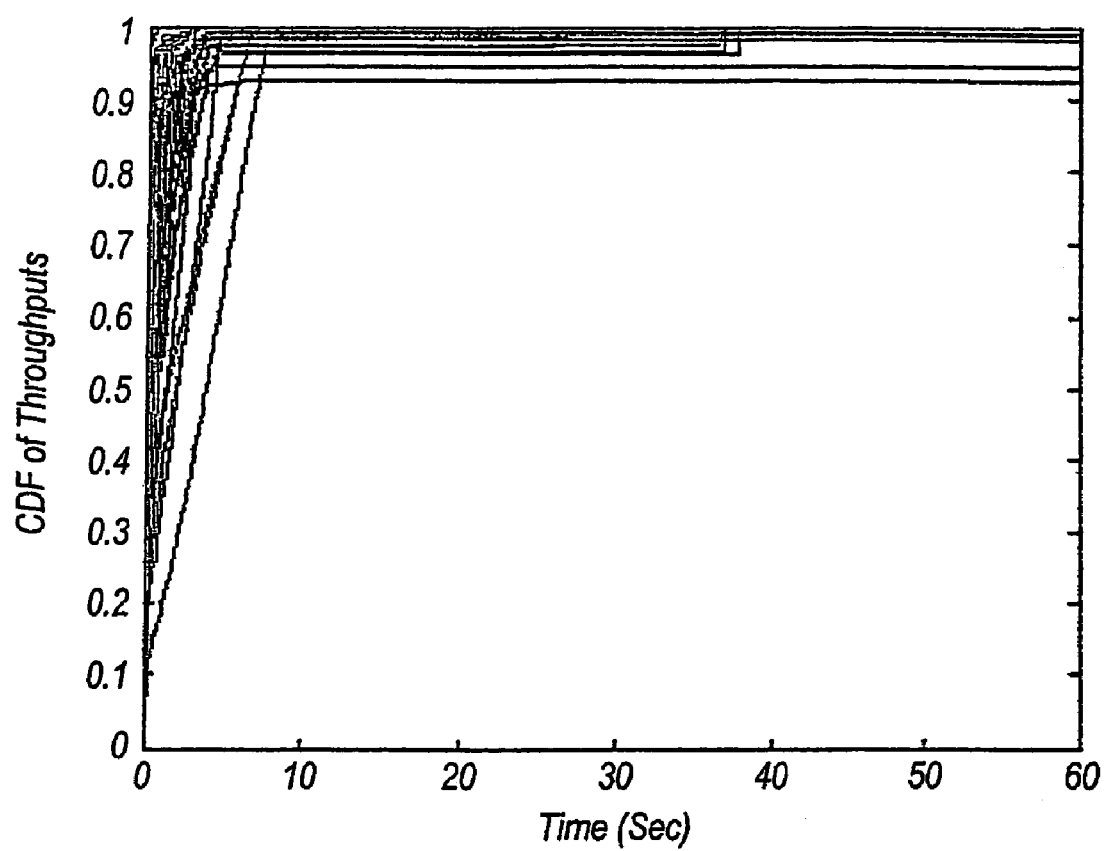

FIGS. 19(A) to 19(C) show respectively the performances of the three schedulers (a) to (c) in terms of the CDF of the throughput of each individual UE over the simulation period. In FIGS. 19(A) to 19(C) the dashed lines represent UEs of video users, and the solid lines represent UEs of WWW users. It can be seen that packets are delivered much faster in the scheduler (c) embodying the present invention.

Next, a second simulation example will be described in which the conditions are assumed to be generally similar to those of the first simulation example. However, in the second simulation example a "good" initial set of weights more appropriate to the conditions than the one used in the first simulation example is assumed. This "good" set of weights is that disclosed in GB 0303859.3 for use when a slowing mechanism is applied to WWW browsing, namely:

$$W_1(1)=1, W_2(1)=10, W_3(1)=/, W_4(1)=1, W_5(1)=1$$

$$V_1(1)=1, V_2(1)=/, V_3(1)=/, V_4(1)=10, V_5(1)=1$$

The "good" set of weights is assumed to be the fixed set of weights applied to the scheduler (b) disclosed in GB 0303859.3 in the following results.

FIGS. 20(A) to 20(F) for the second simulation example correspond to those of FIGS. 18(A) to 18(F) for the first simulation example. It can be seen that the performance of the scheduler (b) in GB 0303859.3 is greatly improved by the use of the "good" set of weights (fixed weights). However, even in this case, the scheduler (c) embodying the present invention improves the performance still further by adapting the weights, see especially FIG. 20(D).

Table 5 below compares the performance of schedulers (b) and (c) for the second simulation example in quantitative form, similar to Table 4 above.

TABLE 5

| Scheduler | (b) | (c) |
|---|---|---|
| Delivered Bit Rate | 2.32 Mbps | 2.1921 |
| Average Throughput | 0.9869 | 0.9982 |
| Average Delay | 0.5697 sec | 0.6172 |
| Satisfied QoS Conditions (Video) | 0.8994 | 0.9590 |
| Satisfied QoS Conditions (WWW) | 0.8658 | 0.8535 |

Figure 20A:
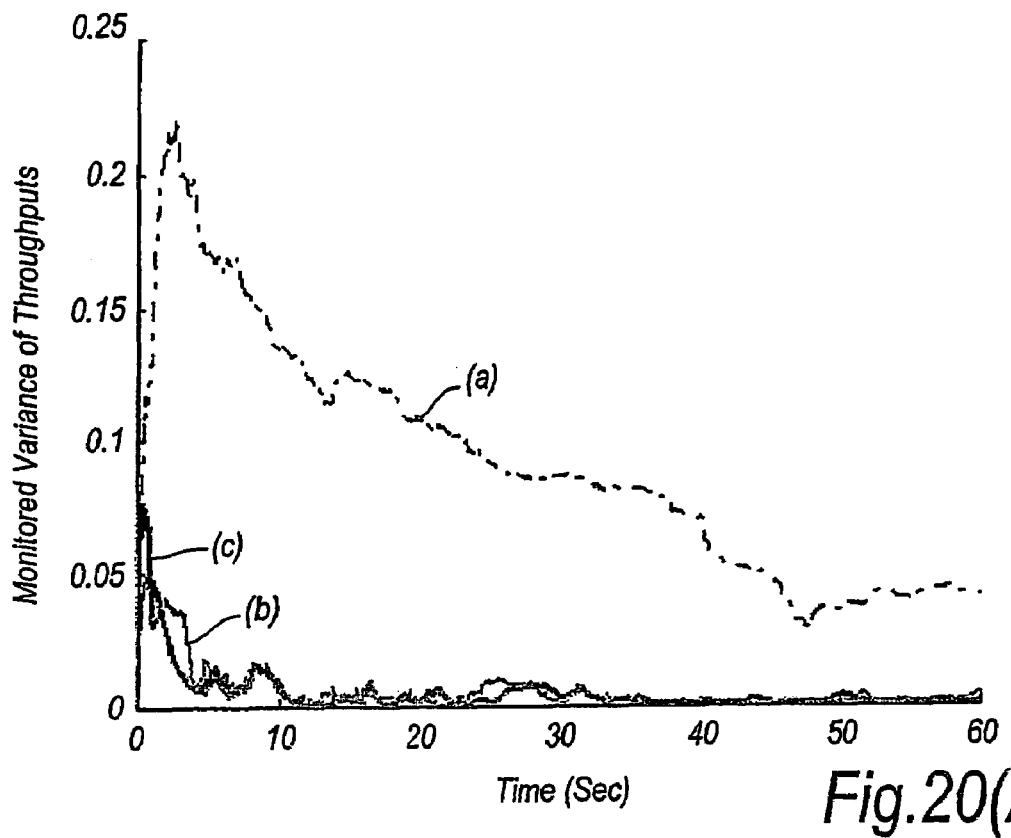
FIGS. 20(A) to 20(F) are graphs corresponding respectively to those of FIGS. 18(A) to 18(F) but relating to a second simulation example.
Figure 20B:
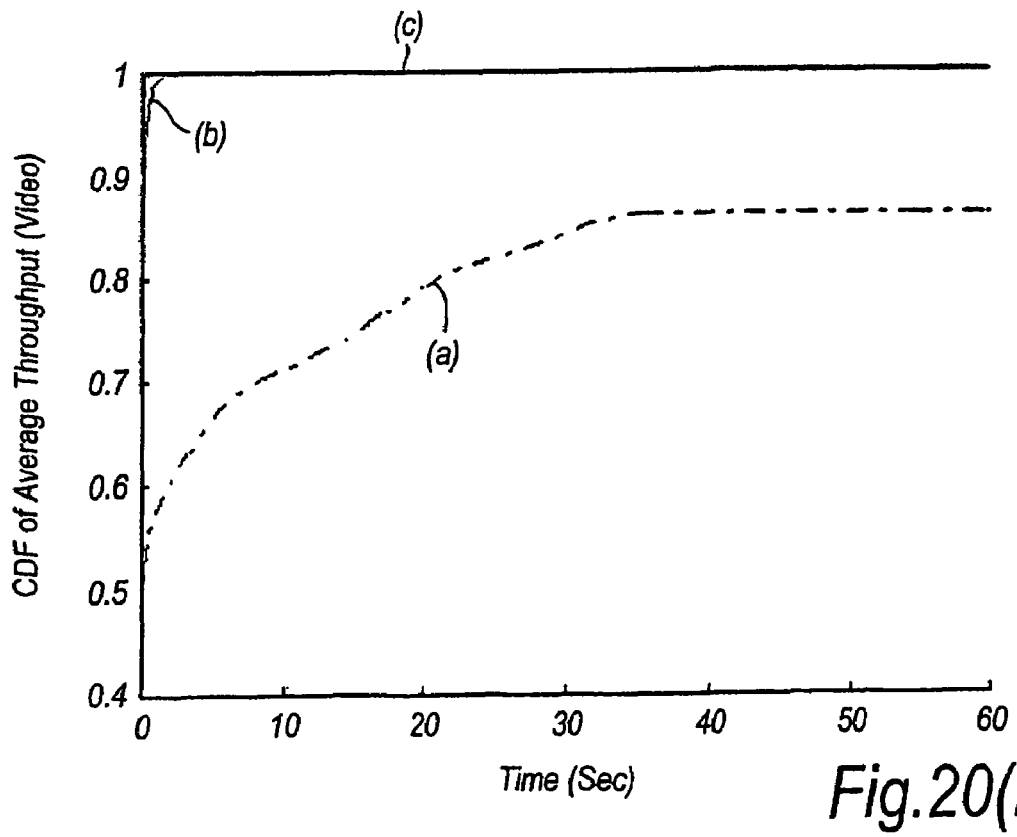
Figure 20C:
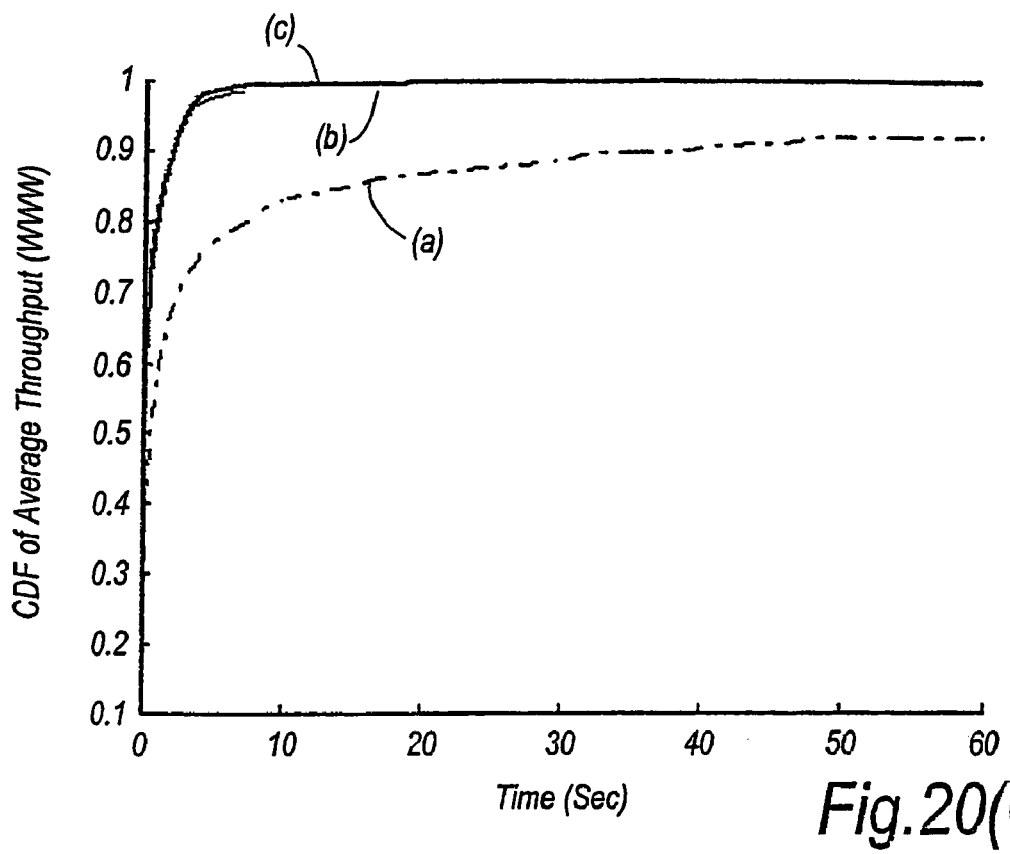
Figure 20D:
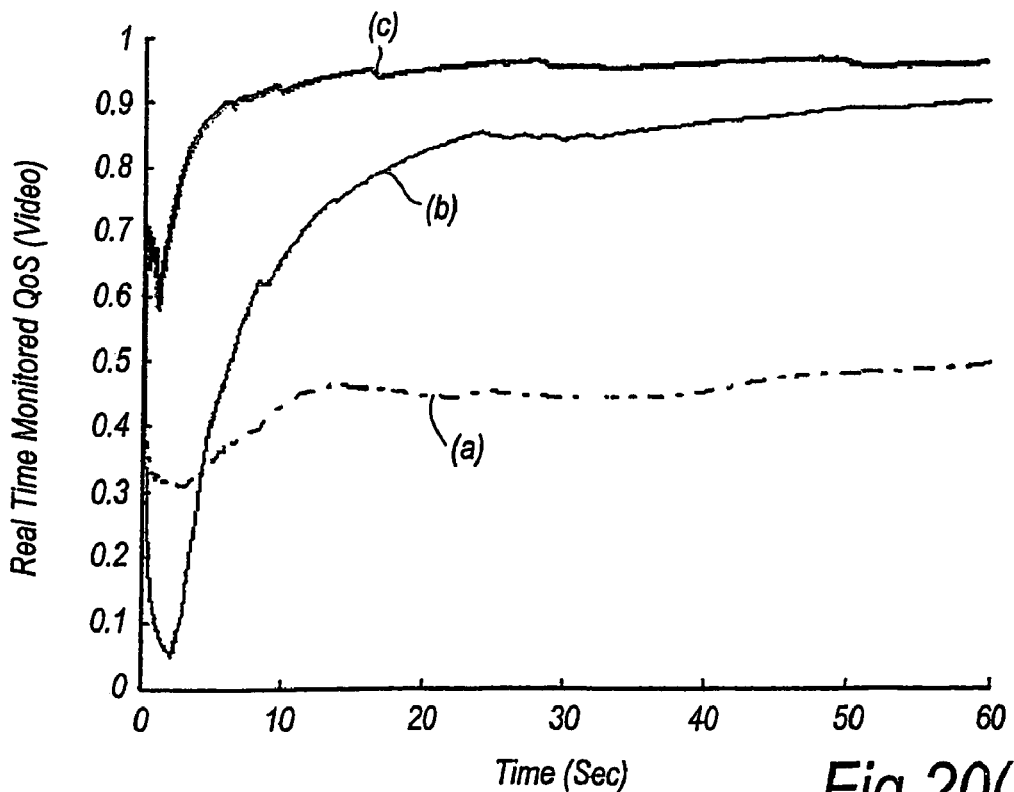
Figure 20E:
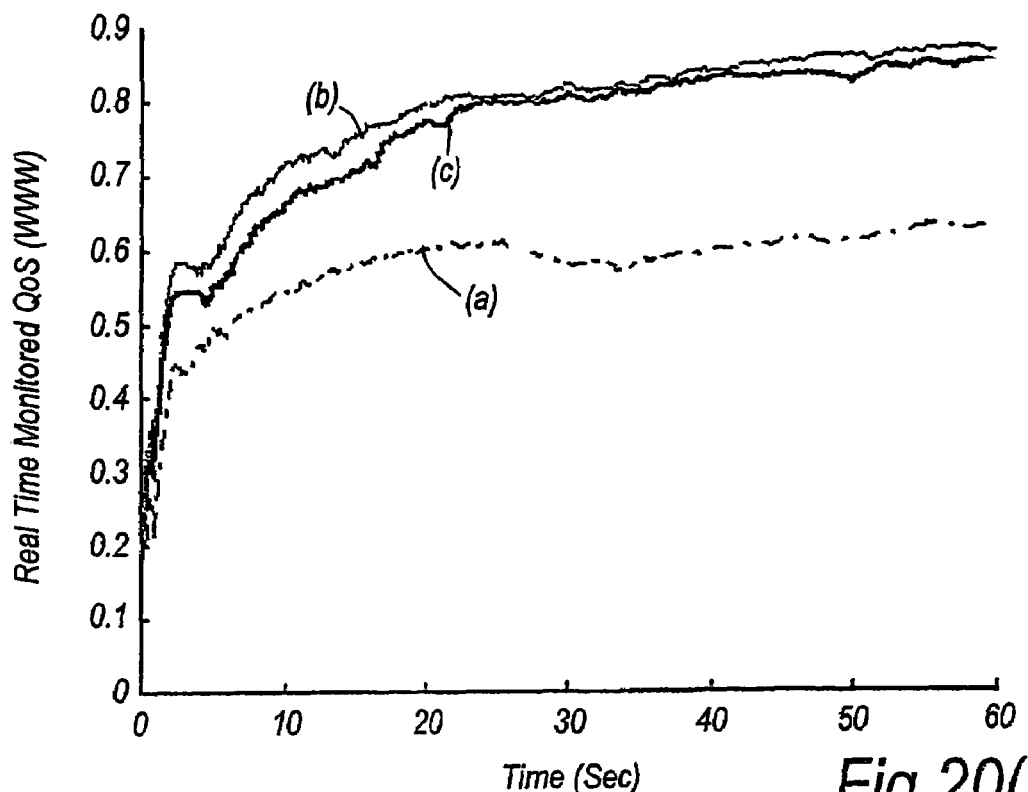
Figure 20F:
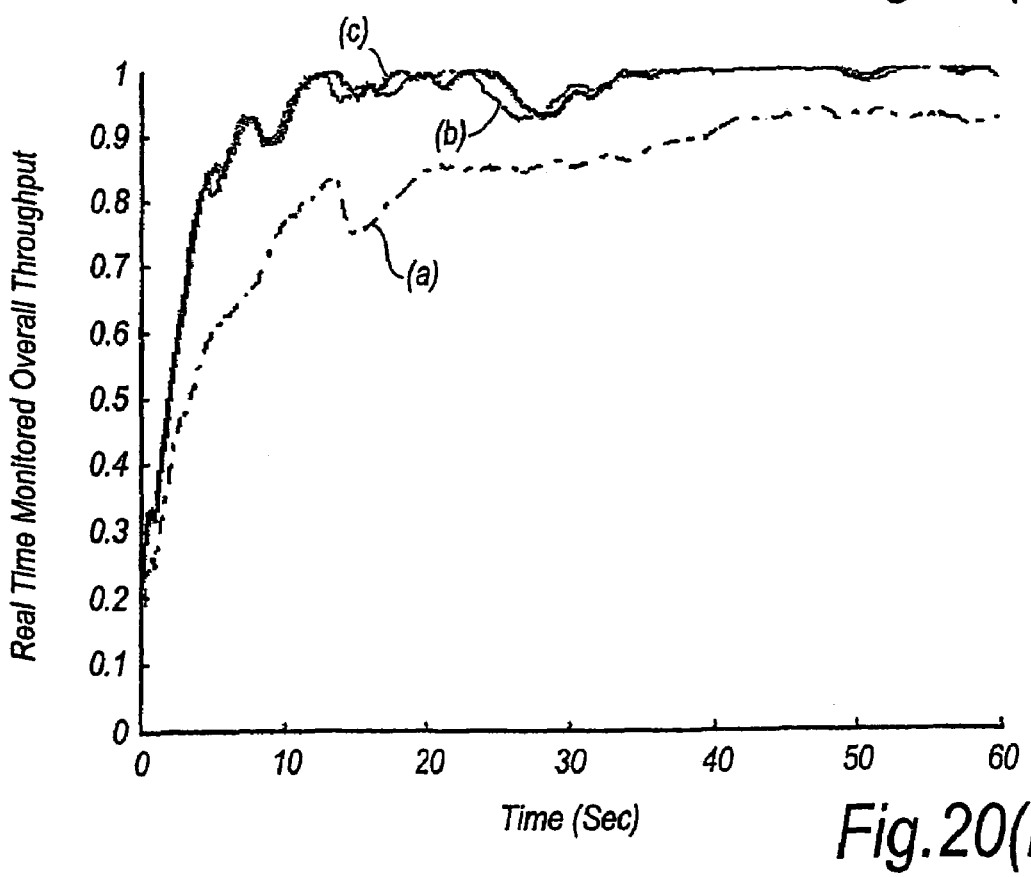

From FIG. 20(E) and Table 5 it can be seen that in order to achieve a better quality of service for video users, the scheduler (c) embodying the present invention reduces the quality of service for WWW users. This is because the fixed service priority parameter ($\beta_1=10$) given to video services is much higher than that ($\beta_2=1$) given to WWW services. FIG. 20(D) shows how successfully a scheduler embodying the invention manages to prevent the QoS drop for video services.

Figure 21:
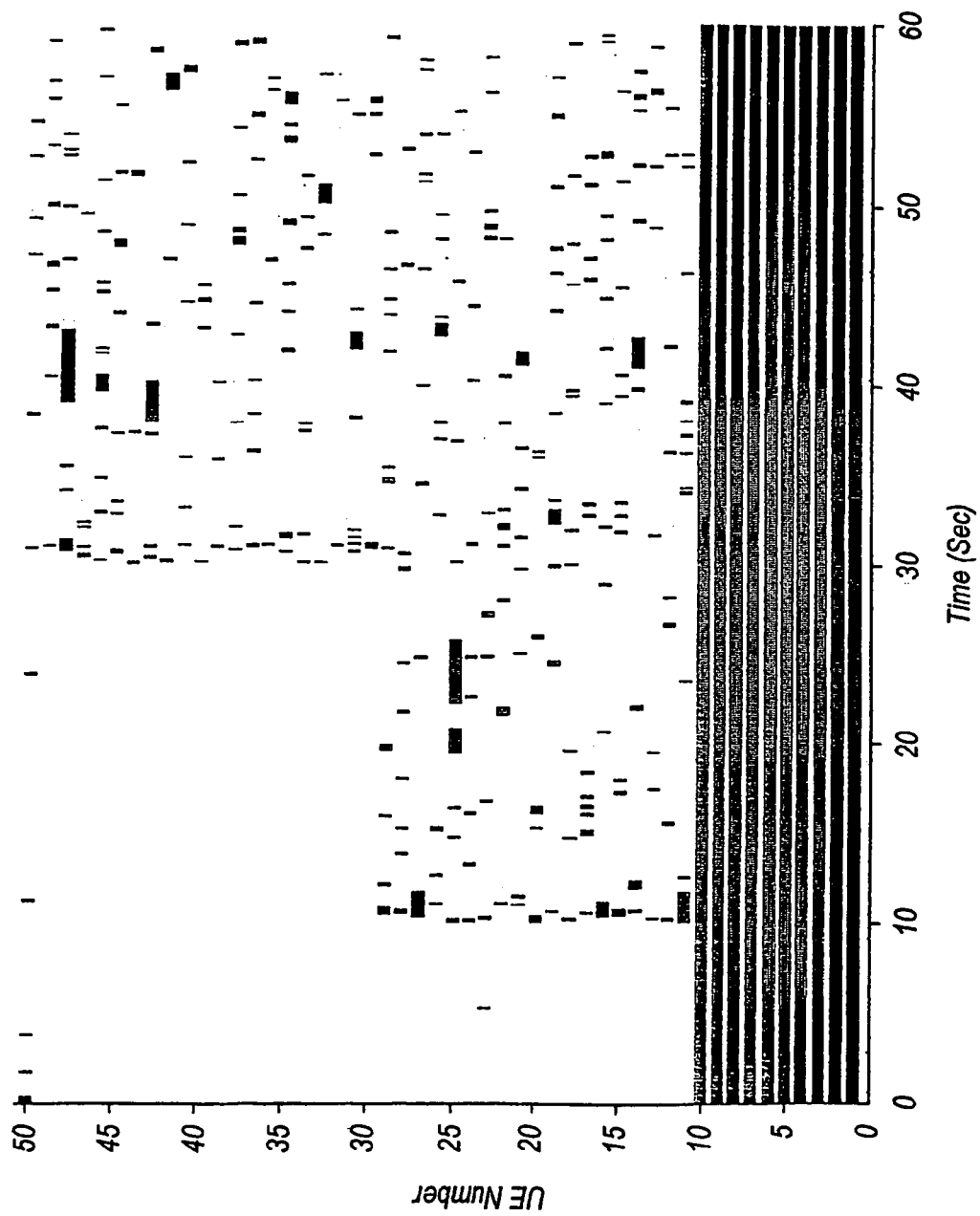
FIG. 21 is a diagram illustrating packet transmission activity in an HSDPA system in a third simulation example.

Next, a third simulation example relating to a changing traffic load scenario is considered. In this third example, there are 50 UEs in total, of which UEs 1 to 10 are video users, and UEs 11 to 50 are WWW users. The assumed packet data arrivals for the different UEs in the third simulation example are shown in FIG. 21. At the beginning of the simulation period, all 10 video users are admitted and a single WWW user is admitted (UE 50). After 10 seconds, the first 19 WWW users are allowed to begin WWW browsing sessions. After 30 seconds, the remaining WWW users are allowed to begin WWW browsing sessions.

FIGS. 22(A) to 22(F) present the performance results for the three schedulers (a) to (c) in the third simulation example. The graphs correspond respectively to FIGS. 18(A) to 18(F) for the first simulation example.

Figure 22A:
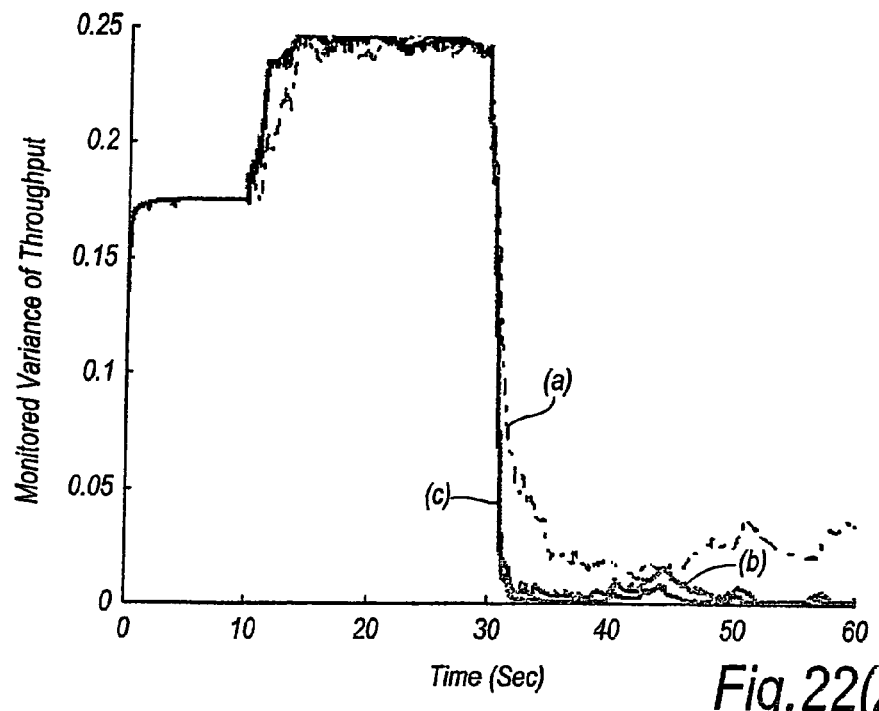
FIGS. 22(A) to 22(F) are graphs corresponding respectively to those of FIGS. 18(A) to 18(F) but relating to the third simulation example.
Figure 22B:
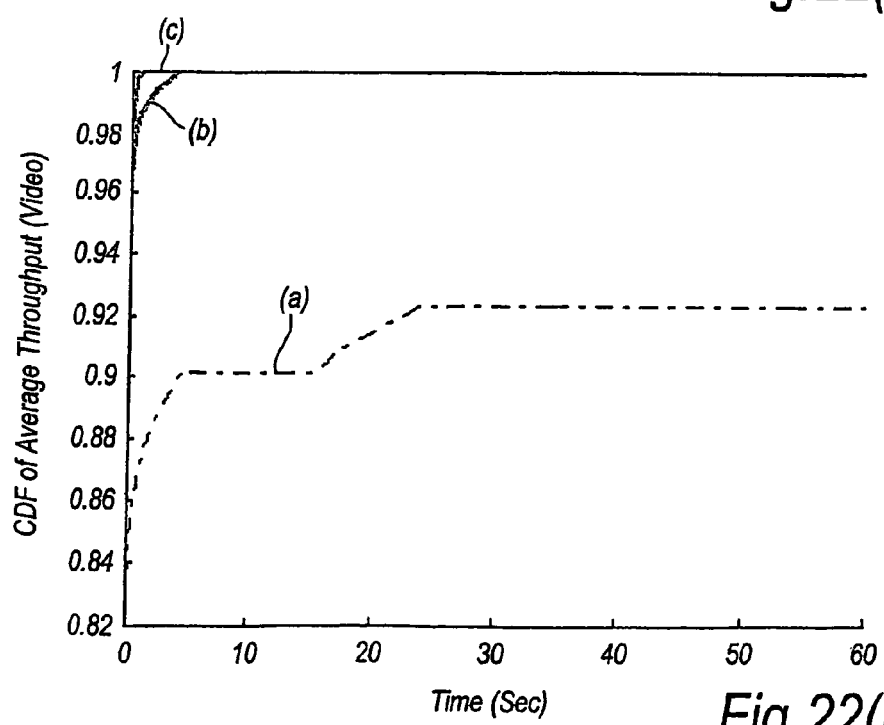
Figure 22C:
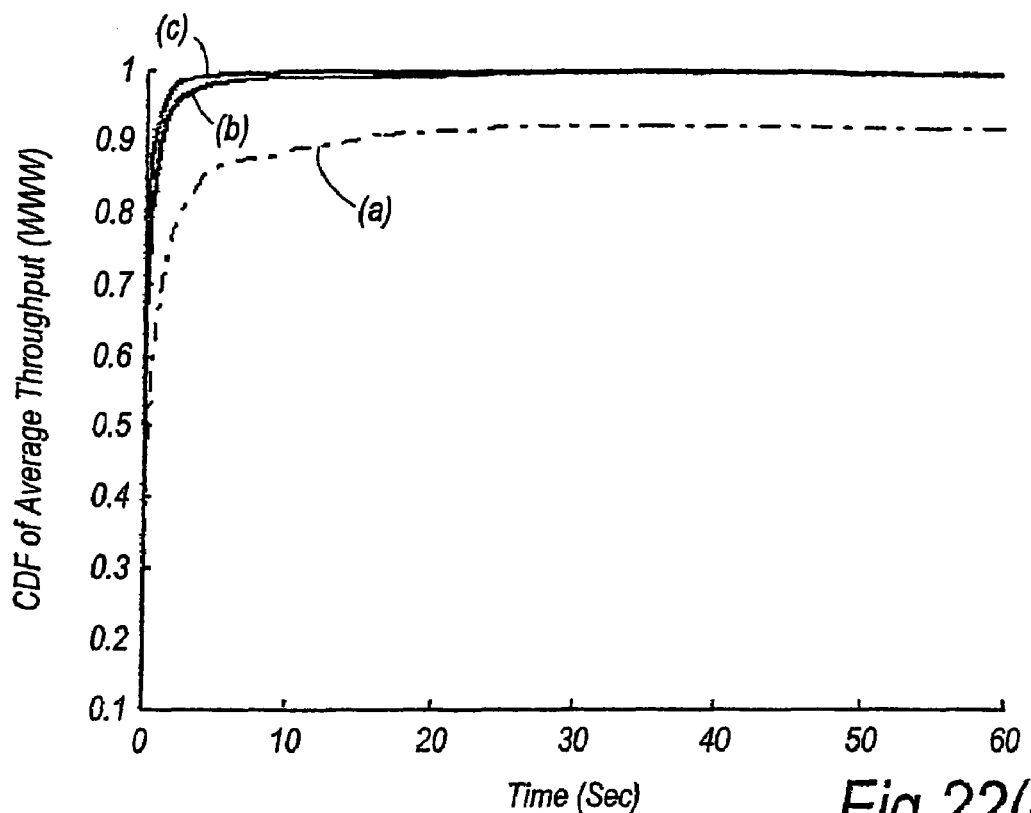
Figure 22D:
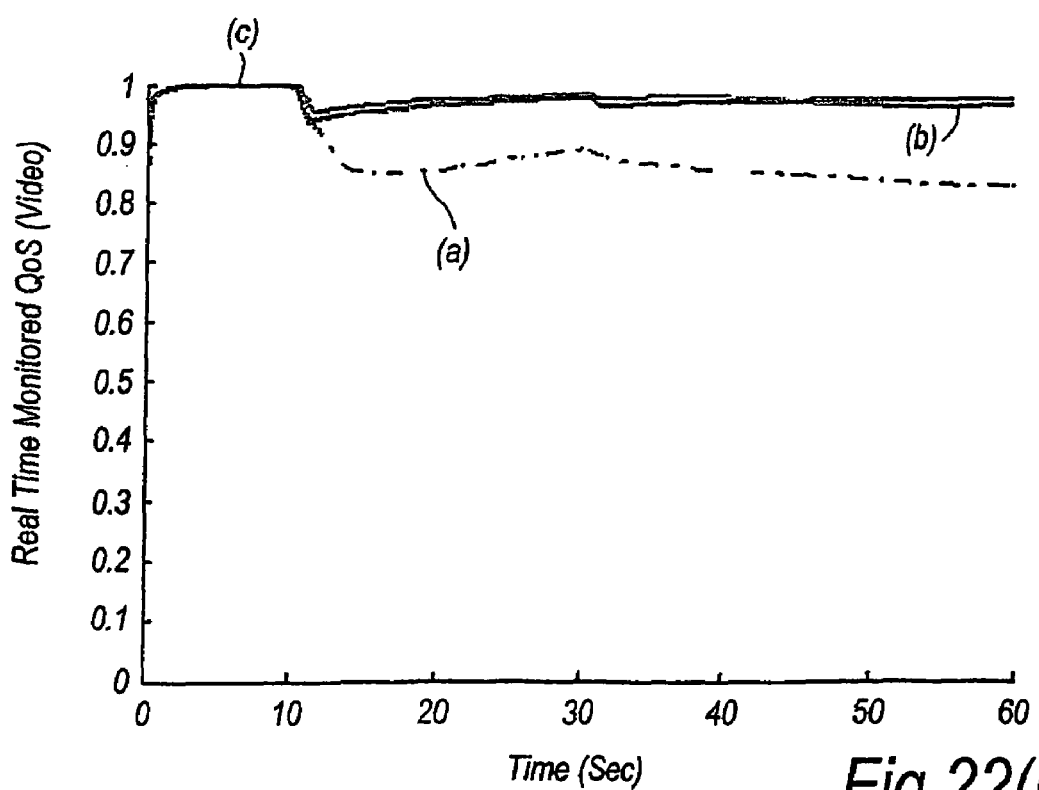
Figure 22E:
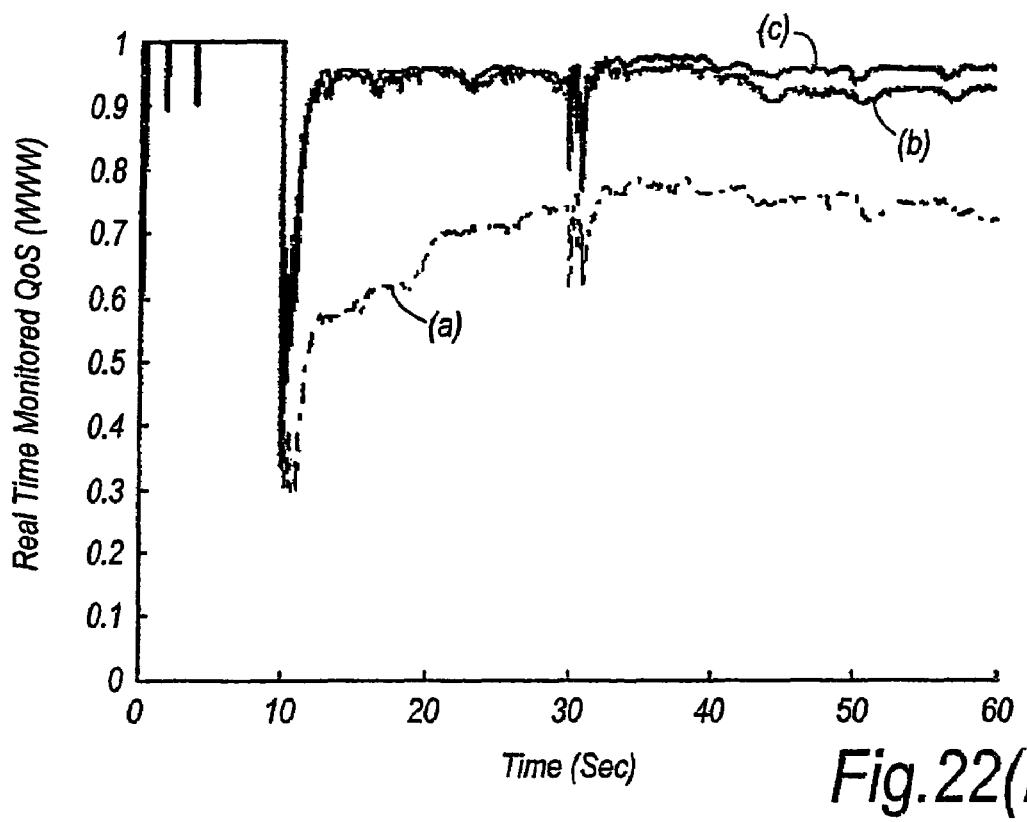

From FIG. 22(E) it can be seen that the performance of the scheduler (a) in terms of QoS drops significantly when new WWW users are admitted after 10 seconds. The scheduler (c) embodying the present invention manages to avoid this situation and provides greater robustness than the fixed-weight scheduler (b).

Figure 22F:
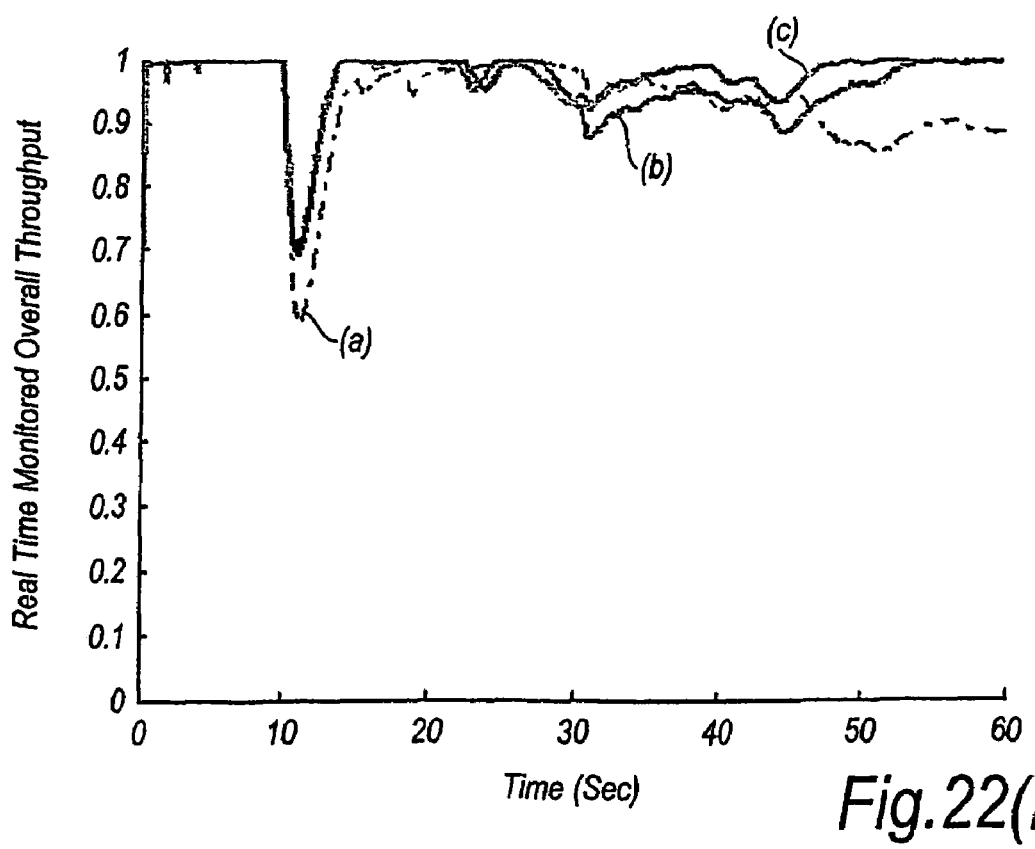

The balancing role of a scheduler embodying the present invention can be observed in FIG. 22(A) which shows that the variance of individual throughputs has been reduced and fairness of delivery has been improved over the entire simulation period. Furthermore, the average throughput curves in FIGS. 22(B) and 22(C) confirm that adapting the weights improves the performance over a comparable fixed-weight scheduler (b). These graphs also show that the scheduler (c) can achieve simultaneously a better QoS for both video services and WWW services than the scheduler (b). FIG. 22(F) shows how successfully the scheduler (c) embodying the invention manages to provide a better instantaneous overall throughput over all of the simulation period.

Table 6 below presents the performance comparisons for the third simulation example in quantitative form, similar to Tables 4 and 5 above.

TABLE 6

| Scheduler | (a) | (b) | (c) |
|---|---|---|---|
| Delivered Bit Rate | 1.074 Mbps | 1.2487 Mbps | 1.2861 Mbps |
| Average Throughput | 0.9203 | 0.9960 | 0.9973 |
| Average Delay | 1.3508 sec | 0.483 sec | 0.2639 sec |
| Satisfied QoS Conditions (WWW) | 0.7276 | 0.9283 | 0.9592 |
| Satisfied QoS Conditions (Video) | 0.8322 | 0.9662 | 0.9770 |

The third simulation example shows that under a heavily-loaded traffic scenario, a scheduler embodying the present invention can improve the total throughput, QoS of services and the average delivery of packets simultaneously while increasing the robustness of the scheduler to the effects of varying traffic load. In a dynamic mobile cellular environment, many new calls with different QoS requirements and delay tolerances can be admitted to a base station. Therefore the nature of input traffic load changes radically as time progresses. A scheduler required to operate in such an environment faces a number of input pipes some of which are aligned and some of which are varied in terms of bit rate. A successful packet scheduler is one that can provide a stable output quality (similar to that which would be achieved in a wired connection as opposed to a wireless environment) despite these varying input bit pipes in a mixed service environment. The results shown in FIGS. 22(A) to (F) confirm that a scheduler embodying the present invention can provide such a stable "wired" output quality over the entire transmission period.

In the embodiment of the present invention described in detail above, a weighted combination of the first measures was produced for each different receiver, and the respective weighted combinations for the different receivers were then compared with one another to decide the receiver(s) to which packets are to be transmitted. However, in other embodiments, the present invention can also be applied to the packet scheduling methods described in S. Abedi, S. Vadgama, "Hybrid Genetic Packet Scheduling and radio Resource Management for High Speed Downlink Packet Access", WPMC 2002 Conference, Hawaii, pp. 1192-1196 and S. Abedi, S. Vadgama, "A Radio Aware Random Iterative Scheduling Technique for High Speed Downlink Packet Access", VTC 2002, Fall, vol. 4, pp. 2322-2326, 24-28, September 2002. For example, in the latter reference a plurality of candidate scheduling solutions $\eta_1$ to $\eta_n$ are generated. Each candidate solution $\eta$ specifies at least the receiver(s) to which packets are to be transmitted in a scheduling instant (eg TTI) under consideration. At least one of the candidate solutions is generated randomly. For each candidate solution $\eta$ a "unified measure of fitness" is calculated according to a fitness function $$f(\eta) = \frac{W_{1E} + W_{2E} \cdot u(\text{Eff\_Oct})}{W_{1E}} \cdot \frac{W_{1D} + W_{2D} \cdot v(\text{Delay\_Profile})}{W_{1D}} \cdot \frac{W_{1F} + W_{2F} \cdot x(\text{Fairness})}{W_{1F}} \cdot \frac{W_{1R} + W_{2R} \cdot y(\text{Ratio\_Waiting\_Oct})}{W_{1R}} \quad (65)$$

where $u(.)$, $v(.)$, $x(.)$ and $y(.)$ are the mapping functions, $W_{1E}$, $W_{2E}$, $W_{1F}$, $W_{2F}$, $W_{1D}$, $W_{2D}$, $W_{1R}$ and $W_{2R}$ are the weighting coefficients, and Eff_Oct, Delay_Profile, Fairness and Ratio_Waiting_Oct are the first measures in this case. The first measure Eff_Oct is an estimate of the number of octets that will be delivered if the solution $\eta$ is chosen. The first measure Delay_Profile is a measure of the delay experienced by the earliest undelivered octet which has arrived at the transmitter but has not yet been delivered. The first measure Fairness is a measure of the expected contribution of the candidate solution $\eta$ to the fairness of the packet scheduling process. The first measure Ratio_Waiting_Oct is a measure of the ratio of octets waiting at the transmitter for transmission to the total number of octets arrived in the node B source queue for the UEs in the candidate solution concerned.

More information about the way in which these first measures are derived can be found in the inventor's paper referenced above, the entire content of which is incorporated herein by reference.

It will be appreciated that the first measures in this embodiment are not calculated per receiver. Instead, they are calculated per candidate scheduling solution. Often, this means that when producing the first measures, aspects of the performance of more than one UE must be taken into account. For example, aspects of the scheduling performance of all the UEs in the candidate scheduling solution may need to be taken into account.

It will be seen from equation (65) that the fitness function is a weighted combination of the first measures, produced in this case for each candidate scheduling solution rather than for each receiver. Once respective fitness functions (weighted combinations) have been produced for the different candidate scheduling solutions, these are then compared with one another to select a best one of the candidate solutions $\eta_{best}$ based on the comparison results.

A similar fitness function is used in the packet scheduling method described in S. Abedi, S. Vadgama, "Hybrid Genetic Packet Scheduling and radio Resource Management for High Speed Downlink Packet Access", WPMC 2002 Conference, Hawaii, pp. 1192-1196. In this case, the packet scheduling method is based on a genetic algorithm, and the fitness functions for the different candidate solutions are compared with one another as part of the process for selecting parents of one generation to have children of a next generation. Thus, in this case, the fitness function is used over a series of generations to arrive at a best candidate scheduling solution. Nonetheless, the fitness functions (weighted combinations) are still employed to decide the receiver(s) to which packets are to be transmitted. Further details of the way in which the fitness function is employed are provided in the inventor's paper, the entire content of which is incorporated herein by reference.

Although an example of the present invention has been described above in relation to a wideband CDMA network having an asynchronous packet mode, it will be appreciated that the present invention can also be applied to any other networks in which a scheduling problem arises. These networks could be, or could be adapted from, other CDMA networks, such as an IS95 network. These networks could also be or be adapted from other mobile communication networks not using CDMA, for example networks using one or more of the following multiple-access techniques: time-division multiple access (TDMA), wavelength-division multiple access (WDMA), frequency-division multiple access (FDMA) and space-division multiple access (SDMA).

Although embodiments of the present invention have been described as having distinct "units", those skilled in the art will appreciate that a microprocessor or digital signal processor (DSP) may be used in practice to implement some or all of the functions of the base station (Node-B) and/or user equipment in embodiments of the present invention.

I claim:

1. A method of a packet scheduling apparatus, for scheduling packets of data from transmission from a transmitter via at least one channel to a plurality of receivers, which method comprises:

producing first measures of scheduling performance in at least two different aspects and employing a weighted combination of the first measures to decide the receiver(s) to which packets are to be transmitted, said weighted combination being produced by combining the first measures according to respective corresponding weights;

producing at least one second measure of scheduling performance in another aspect different from the at least two different aspects of said first measures;

for the or each said second measure, classifying the weights into at least two different classes of weights according to a probable influence the weight is expected to have on the second measure concerned; and employing the or each said second measure, together with the classification of the weights for the or each second measure, to adapt said weights, wherein at least one such weighted combination of the first measures is produced for each receiver, and the respective weighted combinations for the different receivers are employed to decide the receiver(s) to which packets are to be transmitted, generating a plurality of candidate scheduling solutions, each specifying at least the receiver(s) to which packets are to be transmitted;

producing such first measures and such a weighted combination for each candidate solution; and employing the respective weighted combinations for the different candidate solutions to decide the receiver(s) to which packets are to be transmitted, wherein at least one of the candidate solutions is generated using a genetic algorithm.

2. A method as claimed in claim 1, wherein one said class of weights for the or each second measure is a friendly class made up of each weight, if any, whose said probable influence on said second measure is positive.

3. A method as claimed in claim 1, wherein one said class of weights for the or each second measure is a hostile class made up of each weight, if any, whose said probable influence on said second measure is negative.

4. A method as claimed in claim 1, wherein one said class of weights for the or each second measure is a neutral class made up of each weight, if any, whose influence on said second measure is uncertain.

5. A method as claimed in claim 2, wherein a weight in the friendly class for a second measure is increased if that second measure is decreasing.

6. A method as claimed in claim 2, wherein a weight in said friendly class for a second measure is maintained unchanged if that second measure is increasing.

7. A method as claimed in claim 2, wherein a weight in said friendly class for a second measure is increased if that second measure is not changing.

8. A method as claimed in claim 3, wherein a weight in said hostile class for a second measure is decreased if that second measure is decreasing.

9. A method as claimed in claim 3, wherein a weight in said hostile class for a second measure is maintained unchanged if that second measure is increasing.

10. A method as claimed in claim 3, wherein a weight in said hostile class for a second measure is decreased if that second measure is not changing.

11. A method as claimed in claim 4, wherein a weight in said neutral class for a second measure is maintained unchanged irrespective of any change in that second measure.

12. A method as claimed in claim 1, further comprising employing a history of the values of the or each second measure over time to determine if that second measure is increasing, decreasing or not changing.

13. A method as claimed in claim 1, wherein:

each said weight has respective first and second values, the first values being used to produce the weighted combination of the first measures and being subject to one or more prescribed restrictions, and the second values not being subject to said restrictions; and new second values are calculated from previous second values based on said classification and on the or each said second measure; and new first values are derived from the second values in such a way as to ensure that said first values meet said prescribed restrictions.

14. A method as claimed in claim 13, wherein one said restriction is that each first value must be greater than or equal to zero.

15. A method as claimed in claim 13, wherein one said restriction is that the largest first value of any of said weights must not be greater than a predetermined maximum value.

16. A method as claimed in claim 15, wherein said predetermined maximum value is the largest first value in an initial set of the weights.

17. A method as claimed in claim 1, wherein at least one said first measure is independent of at least one said aspect which influences another one of said first measures.

18. A method as claimed in claim 1, wherein at least one said first measure is influenced by a priority assigned to a type of service provided to a receiver.

19. A method as claimed in claim 1, further comprising:

producing respective first and second such weighted combinations of the first measures for each said receiver;

ranking the receivers based on their respective first weighted combinations and forming a list of the receivers in the order in which they are ranked; and allocating channels to the receivers in the list, based on their respective second weighted combinations, staffing from the highest-ranked receiver in the list.

20. A method as claimed in claim 19, wherein the first weighted combination is produced by combining the first measures according to respective corresponding first weights, and the second weighted combination is produced by combining the first measures according to respective corresponding second weights, and said first weights and/or said second weights are classified and are adapted based on said second measure(s) and on said classification.

21. A method as claimed in claim 1, wherein at least one said candidate solution is generated randomly.

22. A method as claimed in claim 1, wherein a plurality of channels are available for transmitting packets from the transmitter to the receivers, and each said candidate solution specifies how the specified receiver(s) is (are) to be allocated to the available channels.

23. A method as claimed in claims 1, wherein said weighted combination is a fitness function.

24. A method as claimed in claim 1, wherein one of said different aspects is success or failure in delivering data to the receiver(s) concerned within a tolerable delay threshold.

25. A method as claimed in claim 1, wherein one of said different aspects is a quality of a channel between the transmitter and the receiver(s) concerned.

26. A method as claimed in claim 1, wherein one of said different aspects is how much data is estimated to be deliverable successfully to the receiver(s) concerned.

27. A method as claimed in claim 1, wherein one of said different aspects is how much data is waiting at the transmitter for transmission to the receiver(s) concerned.

28. A method as claimed in claim 1, wherein one of said different aspects is delay in delivering data to the receiver(s) concerned.

29. A method as claimed in claim 1, wherein one of said different aspects is a commercial aspect.

30. A method as claimed in claim 1, carried out iteratively for a series of scheduling instants, wherein, for each said scheduling instant, a new weighted combination is produced and a new decision is made on the receiver(s) to which packets are to be transmitted.

31. A method as claimed in claim 1, wherein said transmission is a wireless transmission.

32. A method as claimed in claim 1, wherein said transmitter is part of a base station of a wireless communication system, and each said receiver is part of a user equipment of that system.

33. Packet scheduling apparatus, for scheduling packets of data for transmission from a transmitter to a plurality of receivers via at least one channel, which apparatus comprises:

a first measures producing unit which produces first measures of scheduling performance in at least two different aspects;

a decision unit which employs a weighted combination of the first measures to decide the receiver(s) to which packets are to be transmitted, said weighted combination being produced by combining the first measures according to respective corresponding weights;

a second measures producing unit which produces at least one second measure of scheduling performance in another aspect different from the at least two different aspects of said first measures;

a weight classifying unit which classifies the weights for the or each second measure into at least two different classes of weights according to a probable influence the weight is expected to have on the second measure concerned; and a weight adapting unit which employs the or each second measure, together with the classification of the weights for the or each second measure, to adapt the weights, wherein at least one such weighted combination of the first measures is produced for each receiver, and the respective weighted combinations for the different receivers are employed to decide the receiver(s) to which packets are to be transmitted, generating a plurality of candidate scheduling solutions, each specifying at least the receiver(s) to which packets are to be transmitted;

producing such first measures and such a weighted combination for each candidate solution; and employing the respective weighted combinations for the different candidate solutions to decide the receiver(s) to which packets are to be transmitted, wherein at least one of the candidate solutions is generated using a genetic algorithm.

34. A transmitter, for transmitting packets of data to a plurality of receivers via at least one channel, the transmitter comprising:

a first measures producing unit which produces first measures of scheduling performance in at least two different aspects;

a decision unit which employs a weighted combination of the first measures to decide the receiver(s) to which packets are to be transmitted, said weighted combination being produced by combining the first measures according to respective corresponding weights;

a second measures producing unit which produces at least one second measure of scheduling performance in another aspect different from the at least two different aspects of said first measures;

a weight classifying unit which classifies the weights for the or each second measure into at least two different classes of weights according to a probable influence the weight is expected to have on the second measure concerned;

a weight adapting unit which employs the or each second measure, together with the classification of the weights for the or each second measure, to adapt the weights; and a transmission unit which causes packets to be transmitted to the receiver(s) decided by the decision unit, wherein at least one such weighted combination of the first measures is produced for each receiver, and the respective weighted combinations for the different receivers are employed to decide the receiver(s) to which packets are to be transmitted, generating a plurality of candidate scheduling solutions, each specifying at least the receiver(s) to which packets are to be transmitted;

producing such first measures and such a weighted combination for each candidate solution; and employing the respective weighted combinations for the different candidate solutions to decide the receiver(s) to which packets are to be transmitted, wherein at least one of the candidate solutions is generated using a genetic algorithm.

* * * * *